US006830333B2

(12) United States Patent
Feldman et al.

(10) Patent No.: US 6,830,333 B2
(45) Date of Patent: Dec. 14, 2004

(54) COMPUTERIZED PROCESS SERVING FOR THE MANUFACTURE OF CLIP-ONS FOR EYEGLASSES

(75) Inventors: Zvi Feldman, Zoran (IL); Eyal Peleg, Zoran (IL)

(73) Assignee: Opti-Clip International LLC, Boca Raton, FL (US)

( * ) Notice: Subject to any disclaimer, the term of this patent is extended or adjusted under 35 U.S.C. 154(b) by 292 days.

(21) Appl. No.: 09/991,887

(22) Filed: Nov. 26, 2001

(65) Prior Publication Data

US 2003/0101603 A1 Jun. 5, 2003

(51) Int. Cl.[7] .................................................. G02C 7/10
(52) U.S. Cl. .................... 351/177; 351/47; 351/178
(58) Field of Search ............................ 351/178, 41, 44, 351/47, 159, 163, 177

(56) References Cited

U.S. PATENT DOCUMENTS

| | | | |
|---|---|---|---|
| 4,920,700 A | 5/1990 | Murahashi et al. | 51/124 L |
| 5,123,724 A | 6/1992 | Salk | 351/57 |
| 5,347,762 A | 9/1994 | Shibata et al. | 451/15 |
| 5,428,448 A | 6/1995 | Albert-Garcia | 356/376 |
| 5,454,050 A | 9/1995 | Nakabayashi et al. | 382/165 |
| 5,530,652 A | 6/1996 | Croyle et al. | 364/470 |
| 5,546,140 A | 8/1996 | Underwood | 351/47 |
| 5,764,333 A * | 6/1998 | Somsel | 351/47 |
| 5,774,200 A | 6/1998 | Markey | 351/47 |
| 5,809,179 A | 9/1998 | Marimont et al. | 382/254 |
| 5,838,417 A | 11/1998 | Dahan et al. | 351/42 |
| 5,910,854 A | 6/1999 | Varaprasad et al. | 359/273 |
| 5,940,538 A | 8/1999 | Spiegel et al. | 382/236 |
| 5,974,169 A | 10/1999 | Bachelder | 382/151 |
| 6,087,617 A | 7/2000 | Troitski et al. | 219/121.6 |
| 6,122,063 A | 9/2000 | Berndt et al. | 356/376 |
| 6,178,264 B1 | 1/2001 | Kamatani | 382/199 |
| 6,243,960 B1 | 6/2001 | Andrews et al. | 33/507 |
| 6,249,991 B1 | 6/2001 | Rarick et al. | 35/28 |

FOREIGN PATENT DOCUMENTS

| | | |
|---|---|---|
| DE | 196 16 526 A1 | 11/1997 |
| DE | 197 25 159 C1 | 7/1998 |
| DE | 19738668 | 3/1999 |
| EP | 0 839 603 A1 | 5/1998 |
| FR | 2 763 707 | 5/1997 |
| GB | 2 271 631 A | 4/1994 |
| WO | WO 93/24856 | 12/1993 |
| WO | WO 95/04634 | 2/1995 |
| WO | WO 01/53038 A1 | 7/2001 |

OTHER PUBLICATIONS

Jae S. Lim, "Two–Dimensional Signal and Image Processing"; pp. 5–7 (Prentice Hall 1990).
J. R. Parker, "Algorithms for Image Processing and Computer Vision", pp. 23–29 (John Wiley & Sons, Inc.).
John Canny, "A Computational Approach to Edge Detection", pp. 679–698, IEEE Transactions on Pattern Analysis and Machine Intelligence, vol. PAM 1–8, No. 6; Nov. 1986.

* cited by examiner

*Primary Examiner*—Scott J. Sugarman
(74) *Attorney, Agent, or Firm*—Morgan, Lewis and Bockius LLP

(57) ABSTRACT

A system for imaging eyeglasses having lenses, and obtaining data indicative of the outline of the eyeglasses and designated locations associated with the outline. The system includes a positioning device for placing the eyeglasses. The system further includes a short focal length imaging device for acquiring an image of the eyeglasses. The system further includes a processor and a display configured to calculate an editable outline for each eyepiece of the eyeglasses and display the outline and the image, such that the editable outline can be compared to a respective eyepiece of the image. The processor is further configured to calculate supplemental locations linked to the outline for manufacturing holes and/or slots that anchor clip-on parts that include bridge and legs, and for providing data indicative of the specified outline and supplemental locations.

41 Claims, 19 Drawing Sheets

COMPUTERIZED PROCESS SERVING FOR THE MANUFACTURE OF CLIP-ONS FOR EYEGLASSES

FIELD OF THE INVENTION

The present invention is in the general field of obtaining an outline of a pair of eyeglasses for generating an add-on unit such as a clip-on whose lenses are readily mountable on and in registration with the eyeglass frame.

BACKGROUND OF THE INVENTION

There are known in the art many types of add-on units that are fitted onto eyeglass frames. An example is a clip-on that matches in size and shape the eyeglass frame and is configured to be readily mounted thereon. Typically, such a clip-on has dark lenses, and when used, can convert conventional eyeglasses (having optical lenses) to sunglasses. Clip-ons are, thus, quite popular, since they are compact and insofar as the user is concerned, the need to have separate optical eyeglasses and sunglasses is obviated.

Normally, clip-ons are manufactured through a mass production process to fit popular eyeglass designs. Thus, the customer can, upon purchasing eyeglasses not only buy the eyeglasses of interest, but their matching clip-ons as well.

A typical manufacturing process of clip-ons includes feeding to a cutting machine data indicative of the outline of the eyeglass frame and cutting the clip-on lenses according to these data. Additionally, on the basis of pre-knowledge of the designated location of the clip-on parts (such as the bridge that connects the two clip-on lenses), the corresponding holes and sockets that are used to connect the clip-on parts can be prepared.

The outline data can be obtained, inter alia on the basis of known characteristics of the eyeglass frame and supplemental manual/automatic measurements. Once determined off-line, these data can be used throughout the mass production process for this particular eyeglass design.

The need to manufacture clip-ons arises not always on the industrial scale, but sometimes on a smaller scale, in particular in those cases where eyeglasses are not commercially available with a matching clip-on. Consider, for example, a customer who purchases eyeglasses (which are not provided with a clip-on) and wishes to order upon purchase, or later, a customized clip-on.

There is, thus, a need in the art to provide means to readily manufacture a customized clip-on, e.g. at the optometrist's premises. To this end, there is a need to provide a system which is not too expensive and which can scan the eyeglasses and calculate an outline data of the eyeglass frame. These data can be used to cut the clip-on lenses to fit the form and shape of the frame. The device is further capable of calculating the location data of clip-on holes that will be served for anchoring the clip-on parts to the clip-on lenses, such as the bridge that holds together the clip-on lenses.

There is a further need in the art to provide for an integral system which scans the eyeglasses, calculates the frame outline and other necessary data and feeds the data to a cutting machine for substantially real-time production of a customized clip-on.

Considering that the specified system is typically useful for small-scale production, it should be relatively inexpensive in order to be commercially feasible.

There is a further need in the art to provide for a system of the kind specified used with frame-less or partially frame-less eyeglasses.

There is a further need in the art for a system of the kind specified suitable to manufacture eyeglass add-on units other than clip-ons.

There are known in the art publications that deal with the general problem of manufacturing clip-ons and obtaining contour data of objects, as follows: U.S. Pat. No. 5,123,724 to Salk; U.S. Pat. No. 5,347,762 to Shibata; U.S. Pat. No. 5,530,652 to Croyle et al.; U.S. Pat. No. 5,546,140 to Underwood; U.S. Pat. No. 5,774,200 to Markey; U.S. Pat. No. 5,838,417 to Dahan et al.; U.S. Pat. No. 5,910,854 to Varaprasad et al.; U.S. Pat. No. 6,087,617 to Troitski et al.; U.S. Pat. No. 6,243,960 to Andrews et al.; U.S. Pat. No. 6,249,991 to Rarick et al.; FR 2763707; U.S. Pat. No. 5,940,538; U.S. Pat. No. 5,974,169; U.S. Pat. No. 5,454,050; U.S. Pat. No. 5,809,179 and U.S. Pat. No. 6,178,264.

SUMMARY OF THE INVENTION

The present invention provides for a method for imaging eyeglasses, and obtaining data indicative of at least an outline of the eyeglasses and designated locations associated with the outline, comprising:

(a) placing the eyeglasses for imaging;
(b) acquiring and displaying an image of the eyeglasses using a short focal length imaging device;
(c) calculating and displaying an editable outline for each eyepiece of the eyeglasses, such that the editable outline can be compared to a respective eyepiece of the image;
(d) calculating supplemental locations associated with the outline for anchoring parts of an add-on unit; and
(e) providing data indicative of at least said outline and said supplemental locations;

whereby said data is useable for shaping lenses of at least one customized add-on unit and manufacturing in a non-industrial scale the at least one an add-on unit having, each, a size and shape that substantially matches the eyeglasses.

The invention further provides for a method for imaging eyeglasses having lenses, and obtaining data indicative of at least an outline of the eyeglasses and designated locations associated with the outline, comprising:

(i) placing the eyeglasses for imaging;
(ii) acquiring and displaying an image of the eyeglasses using a short focal length imaging device;
(iii) calculating and displaying an editable outline for each eyepiece of the eyeglasses, such that the editable outline can be compared to a respective eyepiece of the image;
(iv) calculating supplemental locations associated with the outline for manufacturing holes and/or slots that anchor clip-on parts that include bridge and legs; and
(v) providing data indicative of at least said outline and said supplemental locations;

whereby said data is useable for shaping clip-on lenses and shaping holes or slots in the clip-on lenses in order to anchor the clip-on parts to the clip-on lenses and to manufacture in a non-industrial scale at least one customized clip-on having, each, a size and shape that substantially matches the eyeglasses.

Still further, the invention provides for a method for manufacturing in a non-industrial scale and substantially in real-time at least one customized clip-on having, each, size and shape that substantially matches an eyeglasses frame, the method comprising the steps of:

(i) placing the eyeglasses for imaging;
(ii) acquiring and displaying an image of the eyeglasses using a short focal length imaging device;
(iii) calculating and displaying an editable outline for each eyepiece of the eyeglasses, such that the editable outline can be compared to a respective eyepiece of the image;
(iv) calculating supplemental locations associated with the outline for manufacturing holes and/or slots that anchor clip-on parts that include at least bridge and legs; and
(v) providing to a shaping machine data indicative of at least said outline and said supplemental locations;
(vi) shaping clip-on lenses and shaping holes and/or slots in the clip-on lenses according to said provided data; and
(vii) assembling the clip-on lenses and the clip-on parts so as to produce said at least one clip-on.

Yet further, the invention provides for a method for imaging eyeglasses having lenses, and obtaining data indicative of at least an outline of the eyeglasses and designated locations associated with the outline, comprising:

(i) placing the eyeglasses for imaging;
(ii) acquiring and displaying an image of the eyeglasses.
(iii) calculating and displaying an editable outline for each eyepiece of the eyeglasses, such that the editable outline can be compared to a respective eyepiece of the image;
(iv) calculating supplemental locations associated with the outline for anchoring clip-on parts; and
(v) providing data indicative of at least said outline and said supplemental locations;

whereby said data is useable for shaping clip-on lenses and to manufacture in a non-industrial scale at least one customized clip-on having, each, a size and shape that substantially matches the eyeglasses.

The invention provides for a system for imaging eyeglasses, and obtaining data indicative of at least an outline of the eyeglasses and designated locations associated with the outline, comprising:
a positioning device for placing the eyeglasses for imaging;
a short focal length imaging device configured to acquire an image of the eyeglasses;
a processor and associated display configured to perform at least the following:
calculating an editable outline for each eyepiece of the eyeglasses and display said outline and said image, such that the editable outline can be compared to a respective eyepiece of the image;
calculating supplemental locations associated with the outline for anchoring parts of an add-on unit; and
providing data indicative of at least said outline and said supplemental locations,
whereby said data is useable for shaping lenses of at least one customized add-on unit and manufacturing in a non-industrial scale the at least one an add-on unit having, each, a size and shape that substantially matches the eyeglasses.

The invention further provides for a system for imaging eyeglasses having lenses, and obtaining data indicative of at least an outline of the eyeglasses and designated locations associated with the outline, comprising:
a positioning device for placing the eyeglasses for imaging;
a short focal length imaging device for acquiring an image of the eyeglasses;
a processor and associated display configured to perform at least the following:
calculating an editable outline for each eyepiece of the eyeglasses and display said outline and said image, such that the editable outline can be compared to a respective eyepiece of the image;
calculating supplemental locations associated with the outline for manufacturing holes and/or slots that anchor clip-on parts that include bridge and legs; and
providing data indicative of at least said outline and said supplemental locations;
whereby said data is useable for shaping clip-on lenses and shaping holes or slots in the clip-on lenses in order to anchor the clip-on parts to the clip-on lenses and to manufacture in a non-industrial scale at least one customized clip-on having, each, a size and shape that substantially matches the eyeglasses.

Still further, the invention provides for a system for manufacturing in a non-industrial scale and substantially in real-time at least one customized clip-on having, each, size and shape that substantially matches an eyeglasses frame, the system comprising:
a positioning device for placing the eyeglasses for imaging;
a short focal length imaging device for acquiring an image of the eyeglasses;
a processor and associated display configured to perform at least the following:
calculating and an editable outline for each eyepiece of the eyeglasses and displaying the outline and the image, such that the editable outline can be compared to a respective eyepiece of the image;
calculating supplemental locations associated with the outline for manufacturing holes and/or slots that anchor clip-on parts that include at least bridge and legs;
providing to a shaping machine data indicative of at least said outline and said supplemental locations;
the shaping machine responsive to said data for shaping clip-on lenses and shaping holes and/or slots in the clip-on lenses according to said provided data, for assembling the clip-on lenses and the clip-on parts so as to produce said at least one clip-on.

Yet further, the invention provides for a system for imaging eyeglasses having lenses, and obtaining data indicative of at least an outline of the eyeglasses and designated locations associated with the outline, comprising:
a positioning device for placing the eyeglasses for imaging;
an imaging device for acquiring and displaying an image of the eyeglasses.
a processor and associated display configured to perform at least the following:
calculating an editable outline for each eyepiece of the eyeglasses and displaying the outline and the image, such that the editable outline can be compared to a respective eyepiece of the image;
calculating supplemental locations associated with the outline for anchoring clip-on parts; and
providing data indicative of at least said outline and said supplemental locations;
whereby said data is useable for shaping clip-on lenses and to manufacture in a non-industrial scale at least one customized clip-on having, each, a size and shape that substantially matches the eyeglasses.

BRIEF DESCRIPTION OF THE DRAWINGS

For a better understanding, the invention will now be described, by way of example only, with reference to the accompanying drawings, in which.

DESCRIPTION OF PREFERRED EMBODIMENTS

Figure 1:
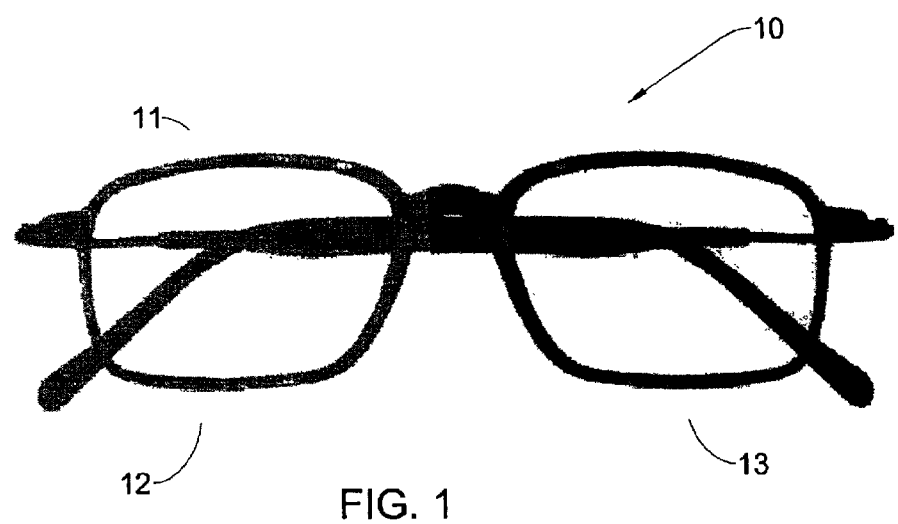
FIG. 1 illustrates schematically a pair of eyeglasses.
Figure 2A:
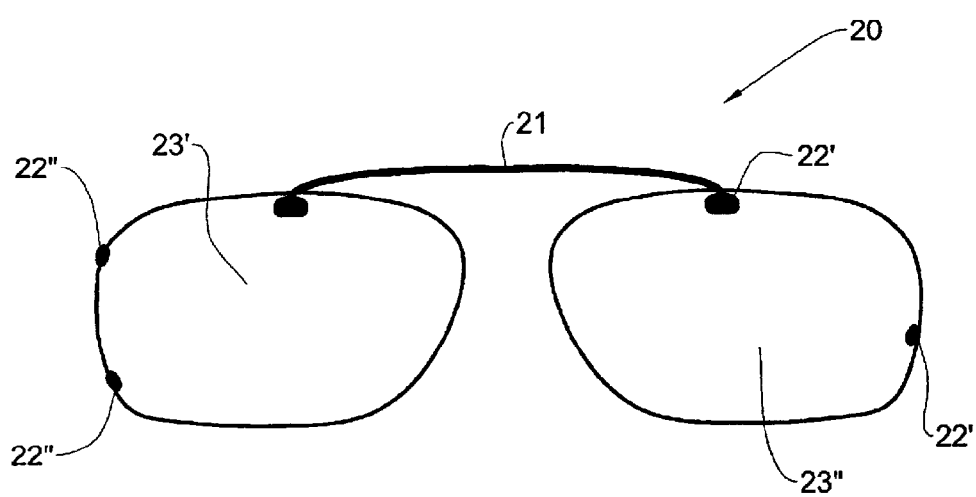
FIGS. 2A–B illustrate schematically two embodiments of a clip-on mountable onto the eyeglasses of FIG. 1.
Figure 2B:
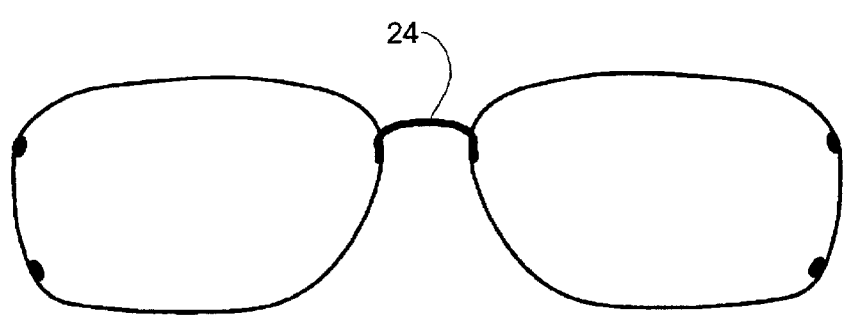

Attention is first directed to FIG. 1 illustrating schematically a pair of eyeglasses (10) (referred to, for simplicity, also as eyeglasses) and to FIGS. 2A and 2B, illustrating schematically two embodiments of a clip-on (20) mountable on the eyeglasses of FIG. 1. The margins of the clip-ons' lens substantially match the external contour of the eyeglass frame (11). The clip-on of FIG. 2A further consists of a bridge (21) and a pair of legs (22') and (22") for each lens, wherein one leg (22') coincides with the bridge end. Note that each clip-on lens (23' and 23") corresponds to a respective eyepiece (12) and (13) in two distinct eyeglasses. (Note that for convenience only, the clip-on lenses 23' and 23" are is depicted as belonging to the same clip-on). FIG. 2B illustrates a similar clip-on having, however, a shorter bridge, (24), and a different leg configuration, insofar as the right eyepiece is concerned.

Figure 3:
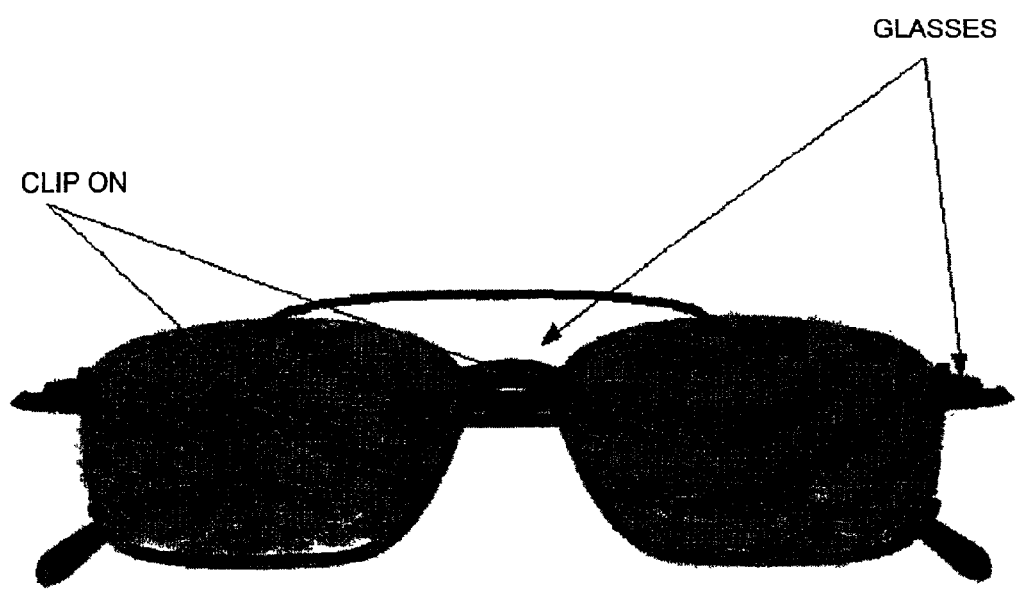
FIG. 3 illustrates schematically a clip-on fitted to and in registration with the eyeglasses.

FIG. 3 illustrates the clip-on of, say, FIG. 2B, mounted on the eyeglasses of FIG. 1 and being in registration therewith.

Those versed in the art will readily appreciate that the invention is bound neither by the specific shape of the clip-on, nor by its specific configuration. Thus, a clip-on having a bridge and legs configuration as depicted in FIGS. 2A and 2B are only two out of many possible applicable variants. For example, the location of the coupling members (e.g. clips) may vary from one application to the other. Note the invention is not bound by any specific manner of mounting the clip-on to the eyeglasses.

Those versed in the art will further appreciate that the clip-on is only one possible customized add-on unit that is embraced by the invention. For convenience only, the description herein focuses mainly on the specific embodiment of a clip-on which converts optical glasses to optical sunglasses or reading glasses.

It should be noted that the manner of mounting the clip-onto the eyeglass frame is generally known per se, and is described, e.g. in U.S. Pat No. 5,123,724.

In order to manufacture a clip-on of the kind specified, it is first required to provide data indicative of the outline of the eyeglass and of supplemental locations, (e.g. holes or slots that will accommodate the legs and bridge ends).

Generally speaking, the outline of the eyesglasses is sought. Where, for example, the eyesglasses include a frame, then the sought outline is the external contour of the frame. By another example, where the eyeglasses are rimless (i.e. have no frame), then the sought outline corresponds to the external margins of the eyeglass lenses.

Note that redundant eyeglass parts, such as handle and bridge, do not constitute part of the sought outline.

These data (i.e., the outline and supplemental data) are then fed to a shaping machine, which, by one embodiment, is an integral milling machine for shaping the lenses of one or more customized clip-on units, drilling the holes and generating the slots, thereby facilitating on a non-industrial scale, the manufacture of the specified clip-on that matches the eyeglasses. Note that the assembly of the legs and bridges into the so-cut holes is generally known per se.

Figure 4:
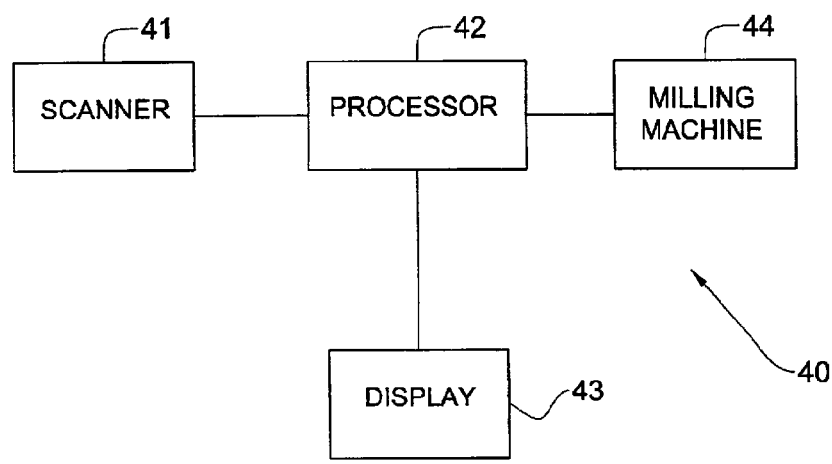
FIG. 4 illustrates a generalized system architecture in accordance with an embodiment of the invention.

Turning now to FIG. 4, there is shown a generalized system architecture (40) in accordance with an embodiment of the invention. The system includes a an imaging device, say a scanner (41) with a short focal length. The scanner scans the eyeglasses, using an illumination source, so as to obtain an image thereof. Using a short focal length is both advantageous and unfavorable for the following reasons. On the one hand, it enables the usage of relatively cheap equipment, such as an office scanner (for example model Astra 3450 commercially available from the Umax company). On the other hand, due the short focal length, distortions are introduced to the so-obtained image, predominantly due to the curvature of the scanned eyeglass lens.

Note that in the context of the invention, the term "short focal length" is basically given via the result test. The deviation of an inspected outline value of an object from the outline dimension of the real object as acquired by an imaging device (such as a scanner) is basically due to a short focus length of the lens of the imaging device. Thus, by defining the maximal allowed deviation, a critical (threshold) value of "short focal length" can be determined, depending upon the particular application.

The maximal allowed deviation in an eyeglass outline in accordance with an embodiment of the invention is estimated to be in the range of 0.2–0.3 mm, and by a specific embodiment is exactly 0.2 mm. It is defined as the maximal difference between the real lens width (i.e. the distance between the minimal and maximal values) and the image width thereof along any given axis (X or Y or in between).

To estimate the threshold value of the short focal length, two reasonable assumptions are made:

The deviation defined above is approximated by the difference between $r_0$ (the inspected value of a point on the outline) and $r_n$ (the corrected value after the $n^{th}$ iteration, close enough to the real value). Actually two values should be summed up for both sides of the frame.

Figure 20A:
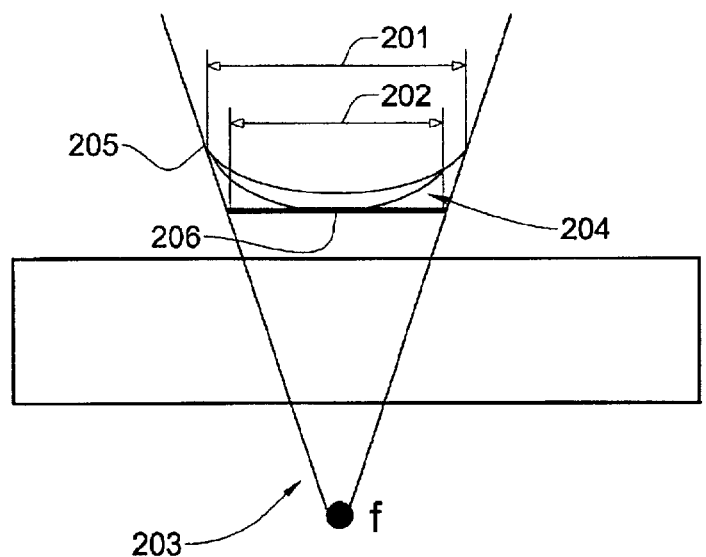
FIGS. 20A–F show a succession of schematic illustrations which assist in understanding the various steps of compensation procedure for the lens curvature induced error, in accordance with an embodiment of the invention.
Figure 20B:
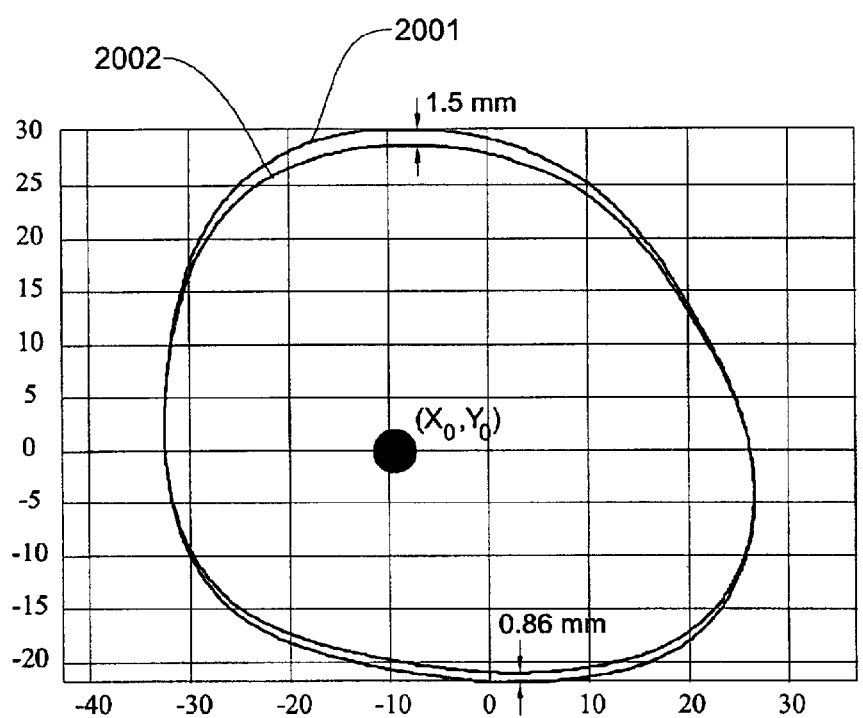
Figure 20C:
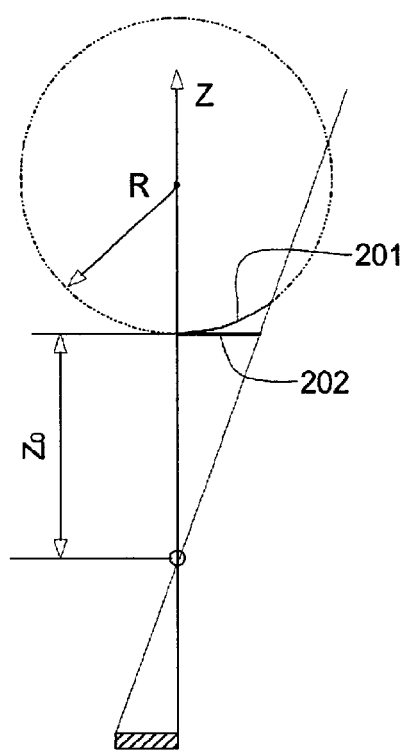

The focal length f is approximated by $Z_0$, the distance between the real object and the focus, as shown in FIG. 20C below.

The value of $r_n$ is given by the iteration equation (13) which is explained later on:

$$r_n = r_0 \left(1 + \frac{\left(R - \sqrt{R^2 - r_{(n-1)}^2}\right)}{Z_0}\right), j = 1, 2, \ldots n$$

Since this equation converges rapidly, only a few number of iterations is needed until a stopping criterion ($r_n - r_{(n-1)}$ <allowed error; e.g. 0.0001 mm.) is satisfied. A typical radius of curvature of the lens is about 80 mm (the Base 6 standard). Note the invention is not bound by this exemplary radius. The results of calculation in accordance with the above recursion equation are given in the following table (for the specific case of 0.2 mm):

| Original value of lens radius* | minimal $Z_0$ value that enables error < 0.2 mm. | Remarks |
|---|---|---|
| 30 | 870 | |
| 40 | 2130 | Max. value for ½ L3 (2D + 3D) |
| 50 | 4370 | |
| 60 | 8100 | Max. value for L5 (3D only) |

The two assumptions made before have opposite sign contributions to the error in focal length, thus reducing the error in estimation.

The short focal length threshold value for a 2-D scanning device is 2000 mm (for the table above). Note that by this particular example, the maximal value for 0.5 L3 was rounded to 2000.

Practically, office scanners, due to their relatively compact dimensions size, have, as a rule, a short focal length.

The short focal length threshold value for a 3-D scanning device is 8000 mm (for the table above). Note that by this particular example, the maximal value for L5 was rounded to 8000.

Most of the cameras without a special zoom lens fulfill that condition. Hence, an algorithm of outline correction (as will be explained in greater detail below) is essential for error correction for all practical use in lenses.

* The maximal distance between the lens holding point and the outermost line is estimated to be L5 for the 3D case and ½L3 for the 2D case. (where L5, and L3 are discussed in detail, with reference to FIG. 7 below).

Whilst in accordance with one aspect of the invention short focal length equipment is used, in accordance with another aspect, other imaging devices, not necessarily of short focal length are used (e.g., video camera imaging device, digitial CCD, etc.) Note that for convenience, the description below focuses mainly on a short focal length imaging device (such as short focal length scanners), however, as specified above, the invention is not bound to this equipment.

Figure 7:
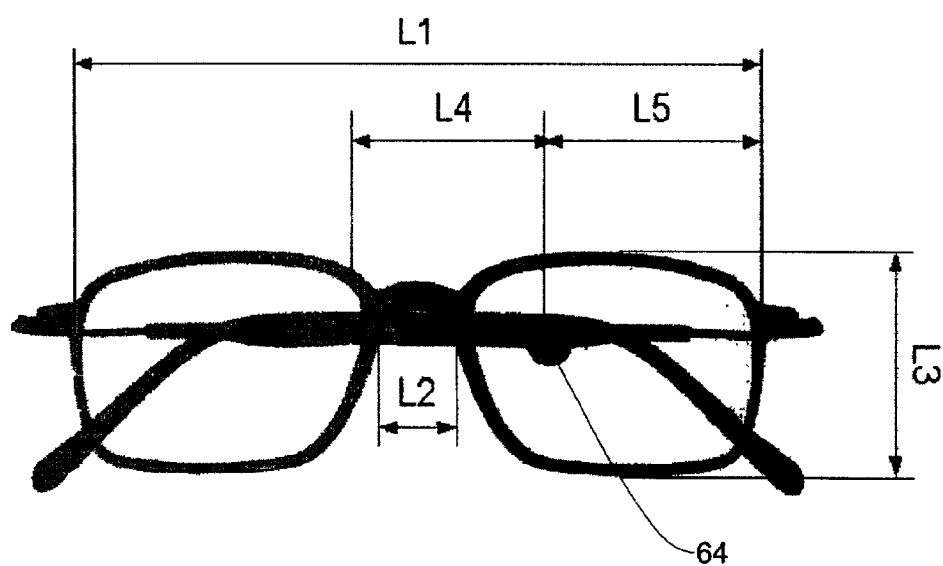
FIG. 7 illustrates schematically scanning constraints, in accordance with an embodiment of the invention.

Reverting to FIG. 7, and having obtained the image of the eyeglasses, an outline of the eyeglass frame is calculated by processor unit (42). As will be explained in greater detail below by a preferred embodiment, only one eyepiece of the eyeglasses is scanned and the outline of this eyepiece (hereinafter the first outline) is calculated. The outline of the other eyepiece is then derived from the first outline, bearing in mind that the second eyepiece is symmetric to the so-scanned eyepiece.

Note that the term "processor" should be construed in a broad manner, including a stand alone processor, network applications where one or more processors are used, or any other suitable processor architecture, etc.

One important feature of the invention is that the so-calculated outline is editable, as it is displayed (in display 43) in a manner which enables the user to compare the outline to the respective eyepiece contour (e.g. in the case of eyeglasses with a frame, to the external contour of the frame). By one embodiment, the outline is superposed on the frame image, and is displayed (42) in a distiguishable manner, say, the frame image is shown in one color and the outline is shown in another color. Due to the editable characteristics of the outline and the fact that it can be easily compared to the eyeglasses' image, the user can readily apply minor modifications, if necessary, in order to adjust the outline to substantially match the contour of the eyeglass fame and thereby assure substantial registration of the so-manufactured clip-on with the eyeglasses. The modifications can be realized by an interface, e.g. as provided in commercially available drawing software (such as Free Hand™), and as will be further exemplified below.

The processor further calculates supplemental data (e.g., location of holes and slots to which clip-on parts such as the legs and bridge are to be anchored).

The outline and supplemental data are provided to a shaping machine, e.g., milling machine (44), which cuts the clip-on lenses and produces the holes at the designated locations (as prescribed by the supplemental data) to thereby facilitate the assembly of the clip-on.

It is readily appreciated that a system of the kind specified offers the non-industrial scale manufacture of customized clip-ons to existing eyeglasses.

Figure 5:
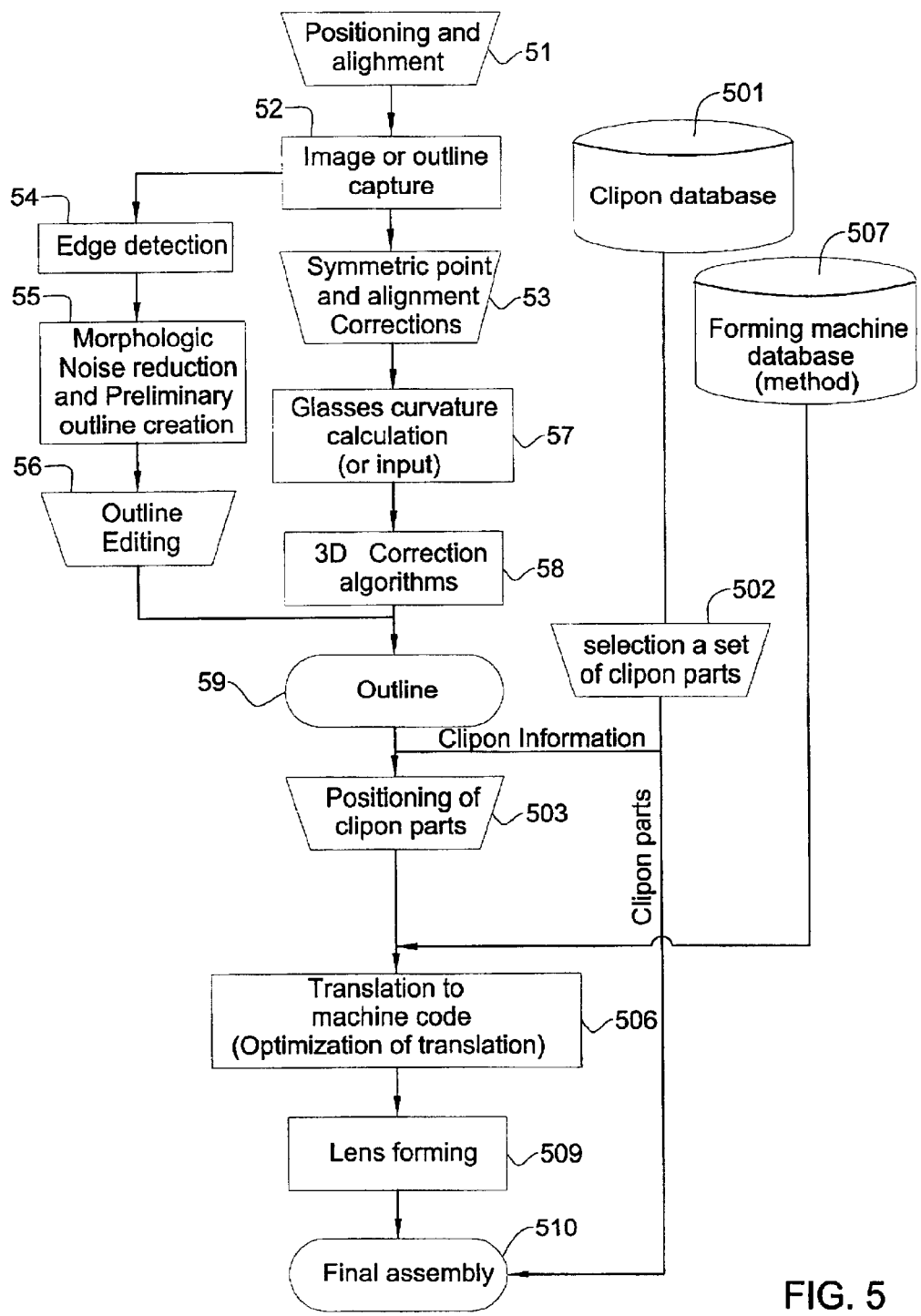
FIG. 5 illustrates a generalized flow chart of the operational, in accordance with an embodiment of the invention.

Attention is now drawn to FIG. 5, showing a generalized flow chart of the operational steps for obtaining an outline of the eyeglass and designated locations associated with the outline, in accordance with an embodiment of the invention. The various steps of the flow chart as depicted in FIG. 5 will be explained in greater detail with reference to FIG. 6 and onwards. Note that the invention is by no means bound by the operational steps of FIG. 5.

Thus, the eyeglasses are positioned for scanning (51) and an image thereof (52) is obtained by scanning, preferably, a part of them, which includes at least a complete eyepiece. As will be explained in greater detail below, in order to calculate the outline and pertinent supplemental locations, a symmetric line is determined (53) that would serve to extrapolate the outline and supplemental data of the other (non-scanned) eyepiece. Moreover, in the case that the eyeglasses were originally misplaced, symmetric point and alignment correction is applied (53). An edge detection procedure is applied (54) and a pertinent morphologic noise reduction and preliminary outline creation procedure is applied (55). The latter step will give rise to frame contour detection and to the removal of artifacts, to thereby enable calculation of the sought outline. The so-calculated outline is displayed, preferably superimposed on the eyeglass frame, enabling the user to edit it (56) so as to substantially match the outline to the frame's external contour.

Note that in the case that the eyeglass frame is not explicit enough (e.g. in frame-less or partially frame-less eyeglasses), the user may, at the onset, enhance the frame's edge contrast (e.g., using a dark marker), and only thereafter scan the eyeglasses in the manner specified. By another non-limiting example, an ultra violet (UV) light source may be used to better distinguish between the eyeglass lenses' margins and the surrounding environment.

Reverting now to FIG. 5, as may be recalled from the discussion above, due to the use of short focal length equipment for scanning the curved eyeglass lens, the eyeglass image is slightly distorted, and as a result, so is the calculated outline. Maintaining this error may lead to the manufacture of a clip-on that will not be in registration with the eyeglasses, which is obviously undesired. In order to cope with the latter error, the lens curvature is provided (57) (e.g., from either an external source or automatically calculated whilst scanning), and an appropriate correction-step procedure is applied (58). The sought outline data are now obtained (59).

On the basis of clip-on parts data selected from a database (501) and the calculated outline, supplemental data are calculated for holes and slots that will accommodate the clip-on parts (503). The outline data and the supplemetal data are translated to machine code (506), depending upon the shaping machine characterisitics. To this end, forming machine database (507) is accessed. Thereafter, the actual shaping is realized (e.g., the clip-on lenses and the holes are cut) (509) and the final clip-on assembly (510) is completed.

Figure 6:
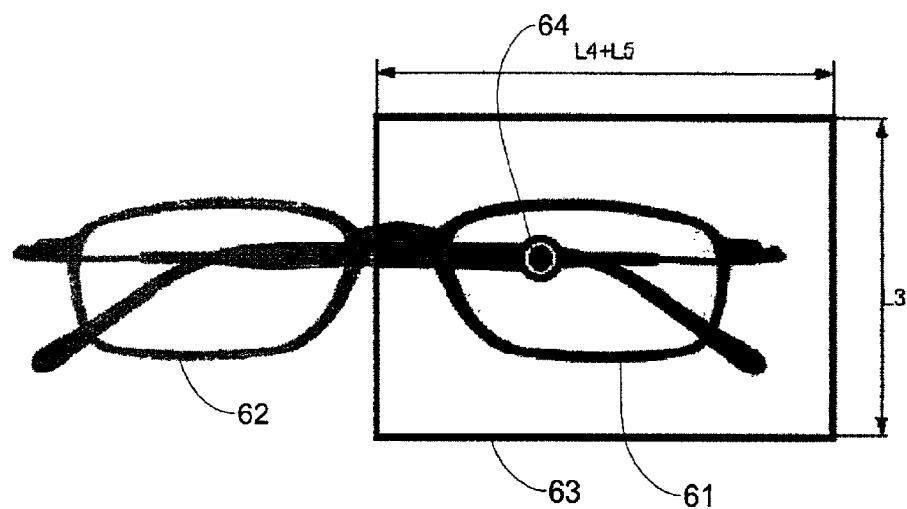
FIG. 6 illustrates schematically a scanning window, in accordance with an embodiment of the invention.

Attention is directed to FIG. 6 illustrating, schematically, a scanning window, in accordance with an embodiment of the invention and to FIG. 7, showing scanning constraints, in accordance with a specific embodiment of the invention. Thus, by a preferred embodiment, the scanning is confined to one eyepiece (61) and the pertinenet outline and supplemental data in respect to the scanned eyepiece frame are calculated. Thereafter, bearing in mind that the second eyepiece (62) is substantially symmetric, it is possible to derive the outline and the relevant supplemental data from those calculated with respect to the first eyepiece (61). The scanning window (63), is thus defined so as to encompass at least one fill eyepiece and preferably also the entire bridge. The latter requirement facilitates the calculation of the eyeglasses' symmetry line (as will be explained in greater detail, below). In order to assure that the scanning window fully encompasses at least one eyepiece, the eyeglasses should be placed, preferably, at a predefined location, e.g., such that the lens of the scanned eyepiece is in full contact with a designated location (64).

The scanning window has (L4+L5×L3) dimensions, which, by one embodiment, comply with the following constraints (see FIG. 7):

| Measurement | No | Range (estimated) [Cm] | Remarks |
|---|---|---|---|
| Bridge | L2 | 1.4–2.4 | |
| Total | L1 | 8.5–20 | Not including the handles and handle holder |
| Half glasses including lens | L4 + L5 | 5–12 | |
| Height | L3 | 1.8–8 | |
| Horizontal distance | L5 | 2–6 | |

Thus, by this embodiment, a 10*12.5 cm window is selected (where 10 is slightly larger than L3 and 12.5 is lightly larger than L4+L5.

It should be noted that the invention is not bound by this imaging configuration for either partial eyeglass image acqusition, or otherwise. Thus, for example, by another embodiment, the whole pair of eyeglasses is acquired. This, however, requires more extensive processing resources as compared to the previous embodiment where only one eyepiece is scanned.

Figure 8:
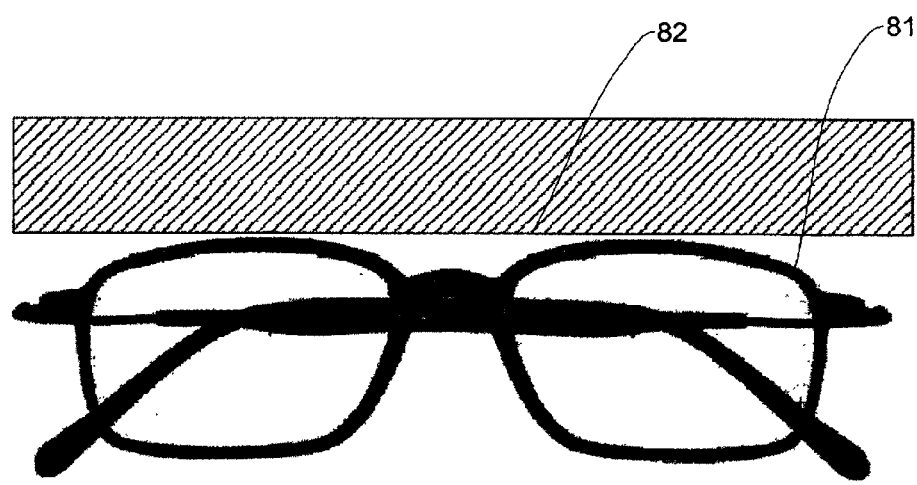
FIG. 8 illustrates schematically a horizontally aligned positioning of the eyeglasses, according to one embodiment of the invention.

Reverting now to step (51), one should bear in mind several considerations insofar as positioning the eyeglasses is concerned. For a better understanding, attention is now drawn to FIG. 8, illustrating schematically a horizontally aligned positioning of the eyeglasses, according to one embodiment of the invention. Insofar as the horizontal placement is concerned, the eyeglasses are placed in a pre-known horizontal orientation, as exemplified by placing the eyeglasses (81) in horizontal orientation as prescribed by lower side (82).

In the embodiment that the eyeglasses are not horizontally aligned, this may adversely affect the symmetry between the two eyepiece images and introduce undue errors to the so-calculated outlines, therefore requiring excessive processing for eliminating or reducing the specified errors.

Vertical allignment is preferably, although not necessarily, also maintained. Upon placing the eyeglasses in the imaging device, they maintain vertical allignment if the following condition is met: an imaginary line that is drawn between the two outermost points of the respective curved lenses is substantially parallel to the plane defined by the imaging device sensored (e.g. the CCD plane). This definition will be further exemplified with reference to FIG. 13, below.

Note that failing to maintain the horizontal and/or vertical alignment would is require (in accordance with a modified embodiment) applying additional processing in order to reduce or eliminate misalignment-related errors.

Figure 9:
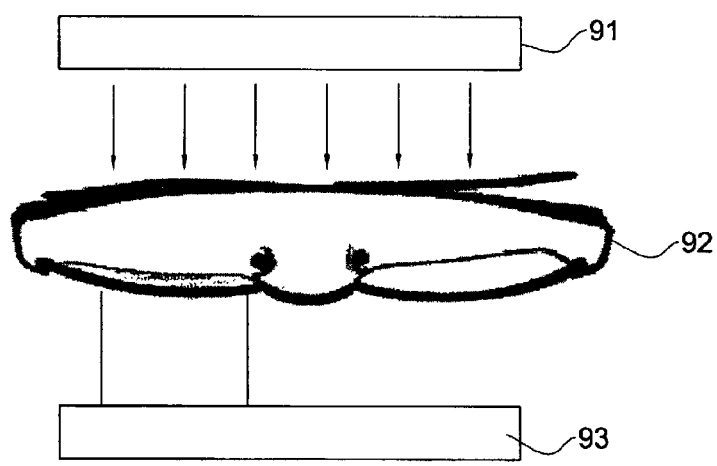
FIG. 9 illustrates schematically a scanning process in accordance with one embodiment of the invention.

Reverting to step (52) in FIG. 5, attention is drawn also to FIG. 9 illustrating, schematically, an imaging process in accordance with one embodiment of the invention. An illumination source (91), projects an illumination beam that passes through the scanned object (92) (e.g., accommodated in window 63 of FIG. 6).

Having scanned the eyeglasses in the manner specified, an image thereof is generated at the imaging device (93) for further processing. Note that in the case that the eyeglasses' edge is not explicit enough, it may be enhanced using e.g., a marker, or by employing an illumination source that falls in the ultra-violet range.

Figure 10A:
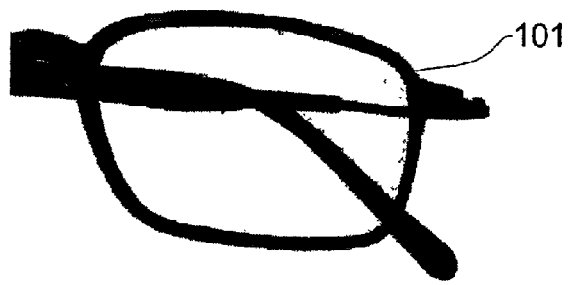
FIGS. 10A–C illustrate schematically an image of a scanned frame that serves for understanding an edge detection step, in accordance with an embodiment of the invention.
Figure 10B:
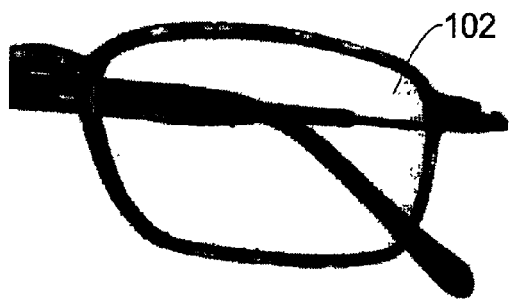
Figure 10C:
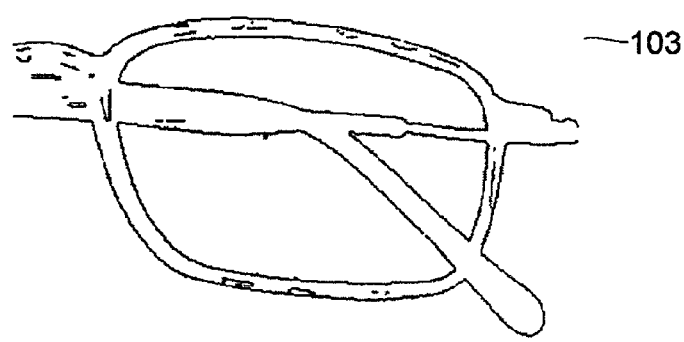

For a better understanding of the edge detection step (54 in FIG. 5), attention is now directed to Figs. FIGS. 10A–C, illustrating schematically an image of a scanned frame, in accordance with an embodiment of the invention. In this embodiment, the so-acquired color digital image (101) in FIG. 10A is converted into a gray level form (102 in FIG. 10B), and is subject to a boundary detection to find the edge. Generally speaking, those pixels whose gray level is significantly different from the gray level values of the the surrounding pixels are characterized as edges. In order to enhance boundary detection, a separate procedure may be carried out in accordance with a modified embodiment for any one of the red/green/blue maps. The resulting edges are depicted in image (103) in FIG. 10C.

Those versed in the art will readily appreciate that the invention is not bound by a specific manner of edge detection and any known per se edge detection algorithms may be employed. Typical examples can be found in:

Canny, John. "A Computational Approach to Edge Detection," IEEE Transactions on Pattern Analysis and Machine Intelligence, 1986. Vol. PAMI-8, No. 6, pp. 679–698.

Lim, Jae S. Two-Dimensional Signal and Image Processing, Englewood Cliffs, N.J.: Prentice Hall, 1990. pp. 478–488.

Parker, James R. Algorithms for Image Processing and Computer Vision. New York: John Wiley & Sons, Inc., 1997. pp. 23–29.

Figure 11:
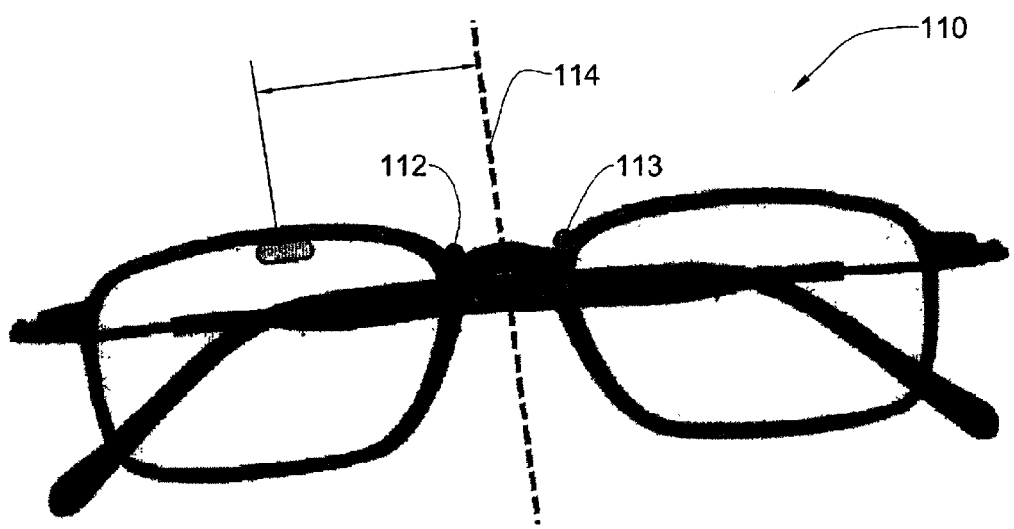
FIG. 11 illustrates an image of the scanned eyeglasses traversed by a calculated perpendicular symmetric line, in accordance with an embodiment of the invention.

For a better understanding of the symmetric point and alignment correction step (53 in FIG. 5), attention is directed to FIG. 11, illustrating an image of the scanned eyeglasses (110) traversed by a calculated perpendicular symmetric line (111). Note that whilst for convenience, an image of the whole pair of eyeglasses is shown, preferably (as explained above), only a portion of the eyeglasses is acquired (encompassing e.g., the eyepiece and the bridge).

There follows a typical, yet not exclusive, example of the operational steps for calculating the symmetry line. At the onset, certain symmetric points are selected (e.g. the two bridge ends 112 and 113) in a manual, semi-automatic or automatic fashion. The selected points preferably comply with the vertical alignment requirement, as specified above.

A connection line (not shown) is drawn between the two selected points (112 and 113) and the symmetric line is calculated to be the normal (114) that traverses the calculated connection line.

The proper holes for the bridge ends (112 and 113) will be drilled on the specified imaginary connection line at equal distance from the symmetry line.

Any calculated location of the hole and/or slot in respect of the scanned eyepiece (e.g. 61 in FIG. 6) is extrapolated also in respect of the other eyepiece (e.g. 62 in FIG. 6) by reflecting the calculated location relative to the symmetry line (114).

Figure 12A:
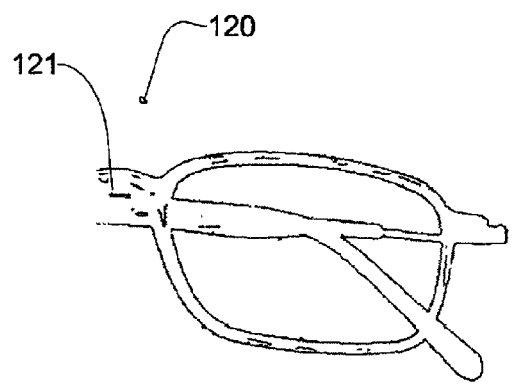
FIGS. 12A–E illustrate schematically a succession of five images of a frame, serving for calculation of a frame outline, in accordance with an embodiment of the invention.
Figure 12B:
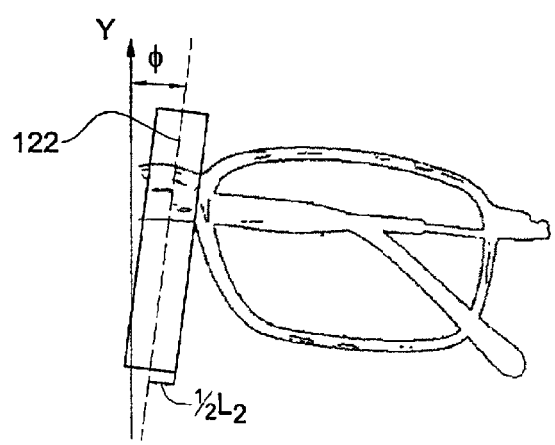
Figure 12C:
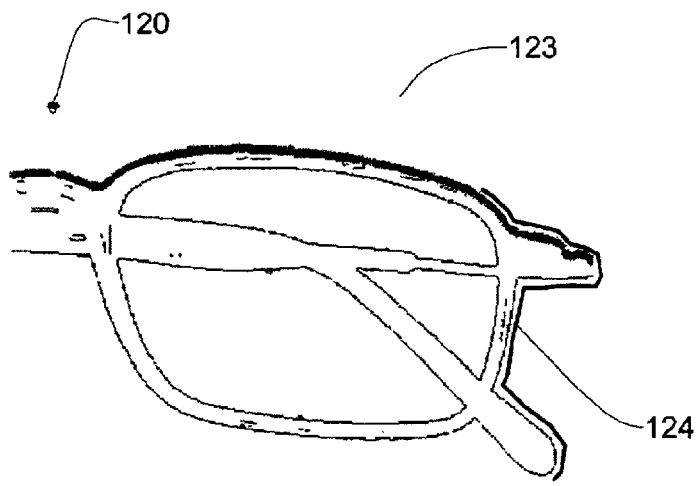

For a better understanding of the Morphologic Noise reduction and preliminary outline creation step (55) in FIG. 5, attention is now drawn to FIGS. 12A–C, illustrating schematically a succession of three images of a frame, serving for calculation of the outline. FIG. 12A shows the resulting image after applying the edge detection algorithm, described in detail with reference to FIG. 10C above.

Initially, all the points that constitute the set of edge points $(X^j, Y^j)$, [j=1, . . . Ne] (as calculated in the edge detection phase) are selected. Some of the so-selected points may reside on the bridge portion (121) which is of no interest insofar as the outline is concerned. It is, therefore, desired to remove these points (if forming part of the calculated edge).

As may be recalled, the line of symmetry has already been calculated. Considering that a typical bridge should be less than L2 cm (see FIG. 7), a semi-automatic (or any other) process is applied to unselect all the points which are closer to the line of symmetry (122) than 0.5*L2 cm. (FIG. 12B) (+safety factor), and which consequently are assumed to form part of the bridge.

The set of remaining points is thus, $(X^j, Y^j)$, [j=1, . . . Se].

There follows now a more detailed description elaborating how to unselect the specified points and how to obtain the outline, remove noise and smoothen the outline. Note that if the eyeglasses do not meet the horizontal alignment condition (i.e. they are displaced by an angle Φ, see FIG. 12B) the image thereof (FIG. 12A) is rotated by the angle Φ.

In order to remove the points at a distance of less than 0.5*L2 cm. from the line of symmetry (plus a safety factor), the following algorithm is applied:

i. The image is rotated by an angle Φ so as to align the line of symmetry along the Y axis (to thereby obtain horizontal alignment), using the known following transformation on all image points:

$$\begin{bmatrix} X'^j \\ Y'^j \end{bmatrix} = \begin{bmatrix} \cos(\Phi) & \sin(\Phi) \\ -\sin(\Phi) & \cos(\Phi) \end{bmatrix} \begin{bmatrix} X^j \\ Y^j \end{bmatrix}, j=1, \ldots Ne \quad (1)$$

ii. All points at a distance of less than 0.5*L2 from the line of symmetry are eliminated, L2 being the minimal bridge length, Se is the number of remaining points.

$$(X^j, Y^j) \subset \text{Set iff } ((Y^j - 0.5*L2) < 0), j=1, \ldots Ne \quad (2)$$

iii. The opposite transformation is operated on all Se remaining points to rotate the outline to original state.

$$\begin{bmatrix} X^k \\ Y^k \end{bmatrix} = \begin{bmatrix} \cos(-\Phi) & \sin(-\Phi) \\ -\sin(-\Phi) & \cos(-\Phi) \end{bmatrix} \begin{bmatrix} X^k \\ Y^k \end{bmatrix}, k=1, \ldots Se \quad (3)$$

The results are shown in FIG. 12B.

After eliminating the bridge points, an algorithm for selecting the outermost contour (external edge) points is activated.

The main steps of the algorithm are as follows:

a. Given a set of points $X^j, Y^j$, [j=1, . . . ,Se] representing an outline, the outline is divided into k equal separate segments, each has a length equal to:
$\Delta X_k = \Delta X/k = (\max(X^j) - \text{Min}(X^j))/k$, where $\max(X^j)$ and $\min(X^j)$ are the points with maximal and minimal X value among all outline points.

b. $(X_k, Y_k)$ is the central point of the $k^{th}$ segment.

c. The points that belong to the $k^{th}$ segment are all points with $X^j$ value in the range $[X_k-\Delta X_k/2, X_k+\Delta X_k/2]$ i.e.: $[X^j \subset X_k$ group iff $(X_k-\Delta X_k/2)<=X^j<(X_k+\Delta X_k/2)$, j=1, ... ,Se]

d. The point with maximal Y value in $X_k$, denoted as $(X^p, Y^p)$, is chosen to represent the $k^{th}$ segment.

e. A series of k points $(X^p, Y^p)$ p=1, ... k is selected to represent one sector of the outline (the highlighted sector 123), as shown in FIG. 12C.

Figure 12D:
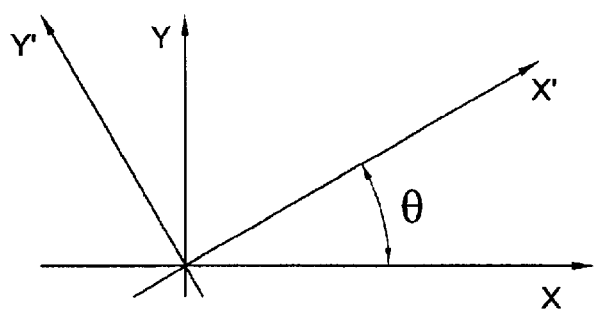

In order to achieve representations of selected points for the entire outline, the algorithm should be activated on the set of edge points at least in a few rotational states. The rotational transformation which is applied to the set of edge points at an angle θ (as shown in FIG. 12D) is as follows:

$$\begin{bmatrix} X'^j \\ Y'^j \end{bmatrix} = \begin{bmatrix} \cos(\theta) & \sin(\theta) \\ -\sin(\theta) & \cos(\theta) \end{bmatrix} \begin{bmatrix} X^j \\ Y^j \end{bmatrix}, j=1, \ldots Se \quad (4)$$

Then a series of k points $(X'^p, Y'^p)$ are selected by the same method, constructing another sector of the outline. (e.g. sector (124), where θ=90°)

The opposite transformation must be operated on both the image matrix and selected points, before activating the algorithm on a new state (i.e. another angle).

$$\begin{bmatrix} X^p \\ Y^p \end{bmatrix} = \begin{bmatrix} \cos(-\theta) & \sin(-\theta) \\ -\sin(-\theta) & \cos(-\theta) \end{bmatrix} \begin{bmatrix} X'^{pj} \\ Y'^p \end{bmatrix}, j=1, \ldots k \quad (5)$$

At each single activation of the algorithm (for a given sector), the k selected points $(X^p, Y^p)$ are sorted by ascending (or descending) order. If the vertical distance between each pair of successive points ΔY is higher than a given value $\Delta Y_{allowed}$, the two points will be considered to belong to a different sub-sector. Hence any sub-sector is composed of points whose Y values differ less than $\Delta Y_{allowed}$ from each other successively. $\Delta Y_{allowed}$ can be calibrated considering the number of sectors and the image typical resolution.

Figure 12E:
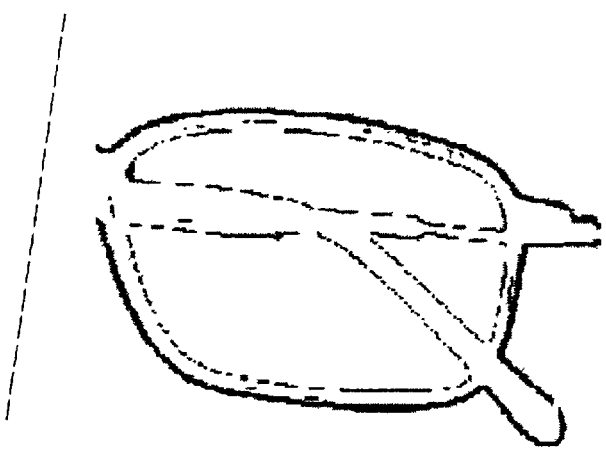

A noise is considered as a group smaller than M elements (M may be calibrated depending upon the particular application), e.g. 120 in FIG. 12A and FIG. 12C and, thus, will be removed from the outermost contour sector. Note that the noise does not appear in FIG. 12E.

The algorithm must be activated at least for the 4 main directions (0°,90°,180°,360°). Adding the 4 diagonal directions (45°,135°,225°,315°) may further smoothen the outline. It is preferable to produce two outermost contours using the 4 main directions and 4 diagonal directions independently and then eliminate those points which are not joined in both subsets.

The final result after union and filtration is shown in FIG. 12F. Those versed in the art will readily appreciate that the invention is by no means bound by the algorithm, described with reference to FIGS. 12A–12F.

Note that by this embodiment, the so-obtained outline is superimposed substantially on the frame's contour image, enabling the user to readily edit the outline and adjust it to better match the frame's external contour.

As explained above, by virtue of the short focal length nature of the imaging equipment and further due to the fact that the lens of the glasses have curvature, an image distortion is introduced. In order to cope with this problem, it is required as a first stage to provide the lens curvature data which will serve for compensating the curvature induced error (discussed in greater detail below). The provision of lens curvature (see e.g., step 57 in FIG. 5) may be accomplished by receiving or extracting an a priori known value of the curvature, or, by another embodiment, calculating it.

Figure 13:
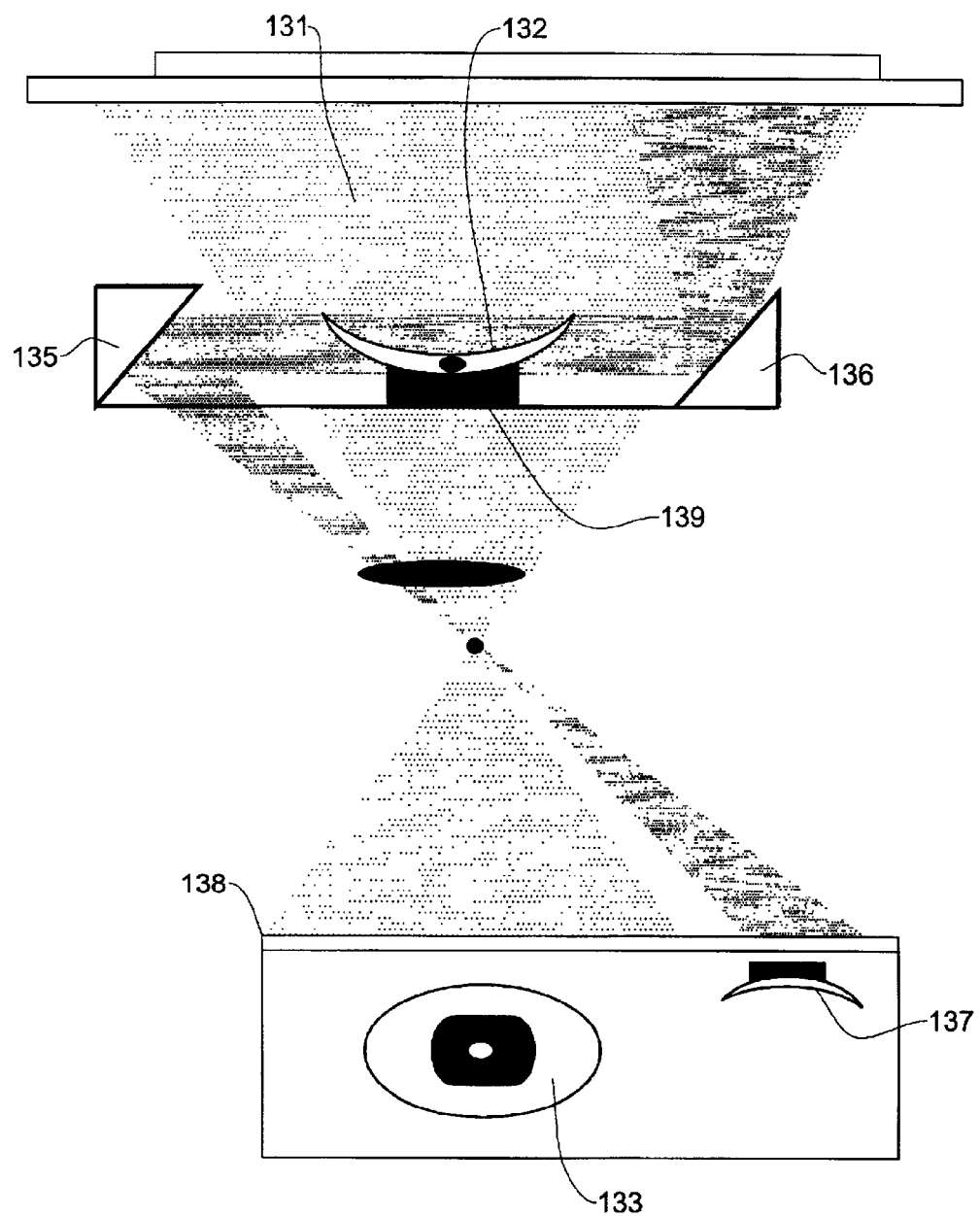
FIG. 13 illustrates, schematically, a scanning processs with an automatic mechanism for measuring lens curvature, in accordance with an embodiment of the invention.

FIG. 13 illustrates schematically a scanning processss with an automatic mechanism for measuring lens curvature, in accordance with an embodiment of the invention;

Generally speaking, the outer side of most of glass lenses is built as a segment of a sphere. This sphere has discrete sizes. By this embodiment, estimating the size of the sphere will enable the correction of image distortion.

In accordance with a manual procedure, the radius of the sphere can be manually measured and fed as input to a subsequent compensation procedure.

In accordance with another embodiment, this can be accomplished automatically, using e.g., the mechanism described with reference to FIG. 13.

As shown, the illumination beam (131) is incident and passes through the lens (132) to generate an image thereof (133) opposite the focal point (134) and after being detected by the sensor array (138), all as known per se.

As further shown in FIG. 13, two prisms (135 and 136) are placed at opposite sides of lens (132), giving rise to the generation of lateral image (137).

In passing, the vertical orientation condition can be demonstrated in FIG. 13, where the line connecting between the two outermost points of the curved lenses (of which one (139) is shown) is parallel to the CCD plane (138).

Figure 14:
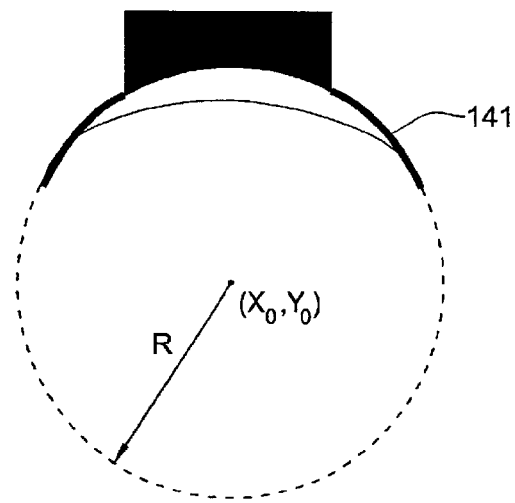
FIG. 14 illustrates an enlarged view of the lens' lateral image obtained by using the automatic mechanism of FIG. 13.

FIG. 14 illustrates an enlarged view of the lens' lateral image (141) obtained by using the automatic mechanism of FIG. 13.

The lens curvature line forms a segment of an imaginary circle (142) and, accordingly, the lens curvature can be calculated from the following algorithmic expression:

$$R=sqrt\ ((X-X_0)^2+(Y-Y_0)^2),$$

where R is the radius of curvature of the lens and $(X_0, Y_0)$ is the central point of circle of curvature.

R, $Y_0$ and $X_0$ can be calculated from the series of points that reside on the lens curvature line (141).

As explained above, an important feature of the invention is that the outline is displayed in a manner which facilitates comparison thereof to the eyeglasses' contour, thereby enabling proper editing and adjusting of the outline. By a preferred embodiment, the outline is substantially superimposed on the frame's contour image.

Figure 15:
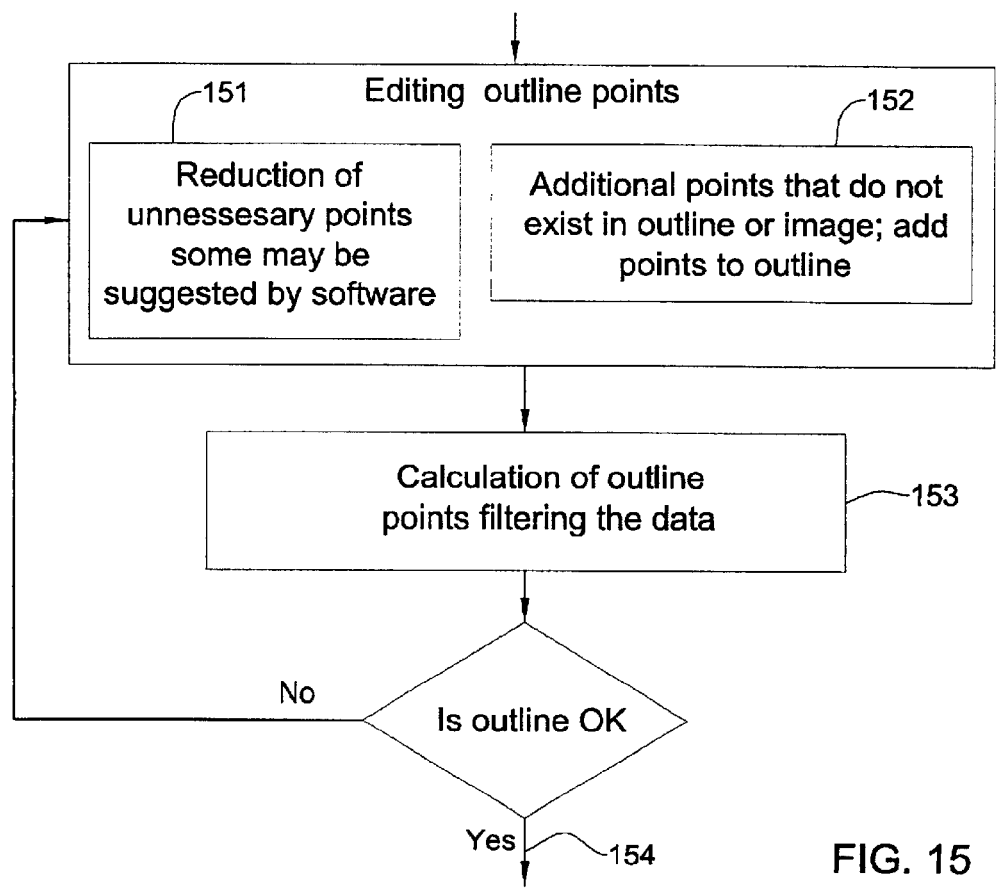
FIG. 15 illustrates a generalized flow chart of the outline editing step, in accordance with an embodiment of the invention.

The editing step (56) is explained in greater detail with reference to FIG. 15.

By this embodiment, when the outline is displayed, the user can delete/add or modify outline sections (151 and 152) to better fit the frame contour and subsequently an outline is calculated (153). This procedure is repeated until the outline is of satisfactory (154) quality. The locations where to add/delete/modify outline sections may be selected by the user, or, if desired, proposed at least partially by the editing module.

Figure 16A:
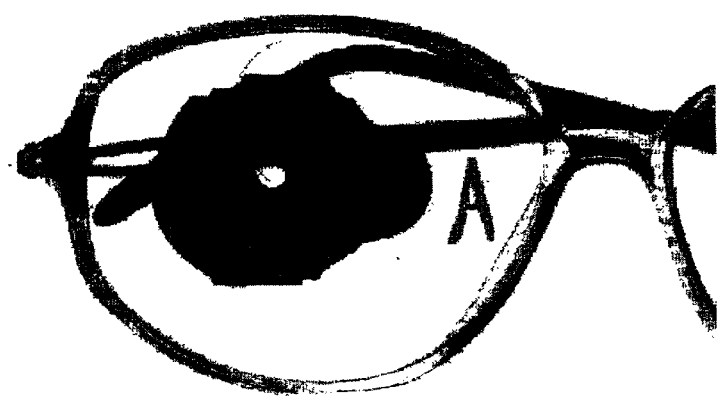
FIGS. 16A–16E illustrate a succession of outline/frame image presentations which will assist in exemplifying the outline editing step, in accordance with an embodiment of the invention.
Figure 16B:
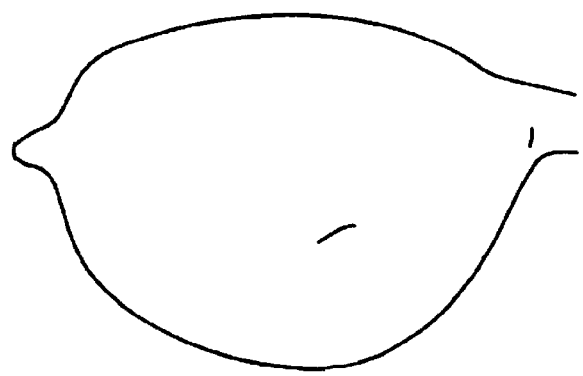
Figure 16C:
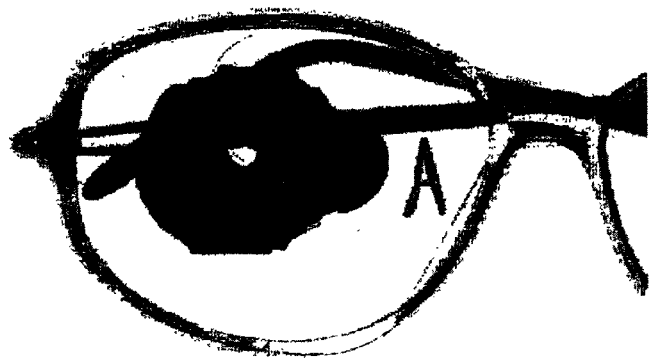

Attention is now drawn to FIGS. 16A–16E, illustrating a succession of outline/frame image presentations which will assist in exemplifying the outline editing step. FIG. 16A illustrates an image of the frame, and the outline that was calculated in step (55) (of FIG. 5) is shown in FIG. 16B. FIG. 16C illustrates the outline superimposed on the frame image to substantially match the external contour line thereof.

Figure 16D:
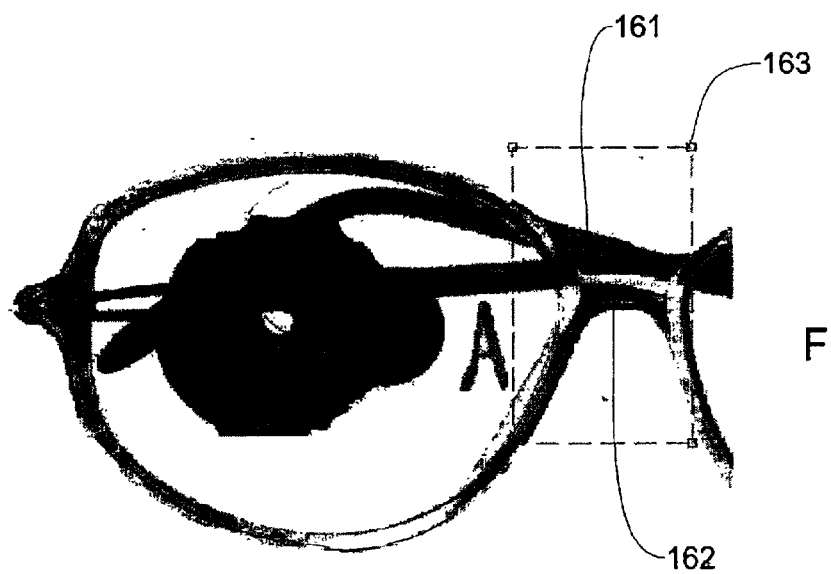
Figure 16E:
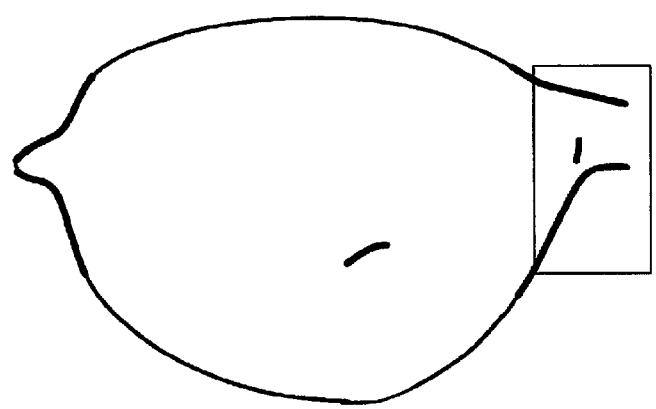

FIG. 16D illustrates a procedure of deleting unnecessary outline portions (161 and 162) as embraced by window (163). The interface used herein for the deletion operation is similar to the interface available in commercially available drawing software packages and is not further expounded upon herein. Of course, the invention is not bound by any particular interface and/or editing commands.

By one embodiment, in order to enhance the edited portion, the display can be switched to show only the edited outline portion (FIG. 16E), and/or a zoom in/out option may be available. If desired, an undo option may also be offered. Other editing features may be available, all as required and appropriate.

Figure 17:
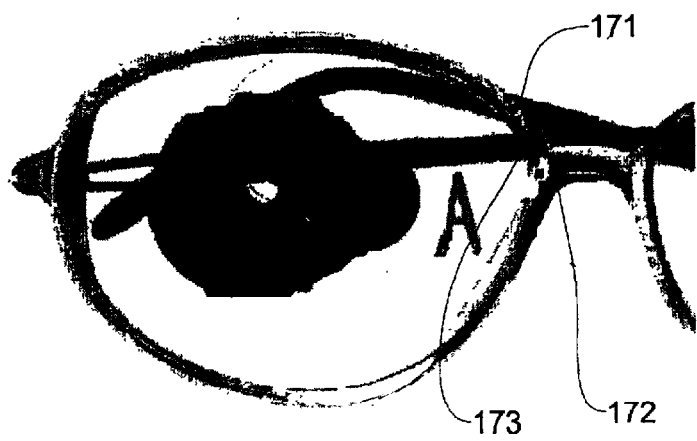
FIG. 17 illustrates an exemplary outline superimposed on the frame image's external contour during an editing process, in accordance with an embodiment of the invention.

Turning now to FIG. 17, there is shown an exemplary outline superimposed on the fame image's external contour during the editing process of adding the outline section. By one embodiment, the user identifies the part of the outline which needs completion, e.g. by clicking the edges of the line (say 171 and 172 in FIG. 17), and the required section (173) is added.

A typical, yet not exclusive, exemplary algorithm for achieveing outline completion is described below, with reference to FIGS. 18A–18B.

Figure 19A:
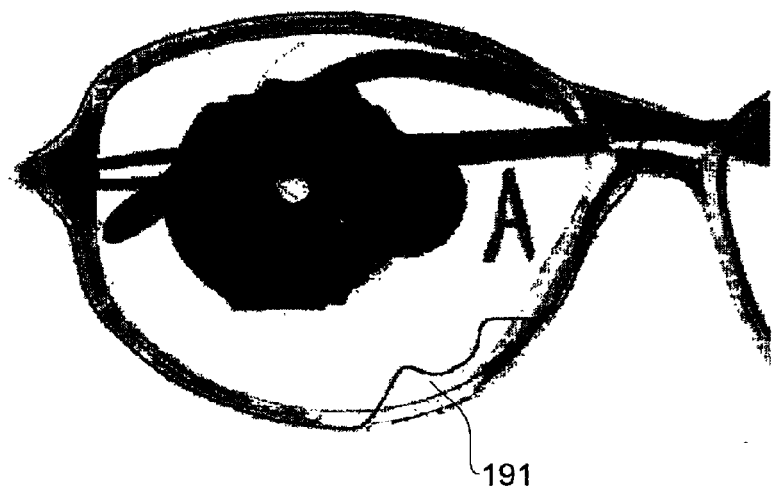
FIGS. 19A–B illustrate an exemplary outline before and after the application of a smoothing procedure in accordance with an embodiment of the invention.
Figure 19B:
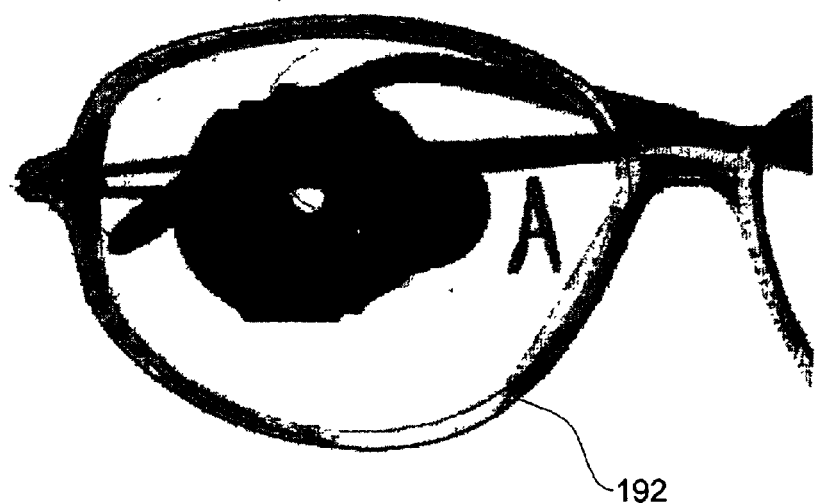

The target is to get an output of a closed curve while reducing the high frequency (exemplified in FIG. 19A-191) portion of the outline function and smoothen it (192 in FIG. 19B).

The process involves the following steps:

1. All the k initial outline points $(X^j, Y^j)$ (as obtained from calculating the outline—see description with reference to FIG. 12E above) are transformed to the R-θ plane where R and θ are the polar coordinates:
2. A reference point $(X_0, Y_0)$ for the transformation is chosen. This point can be chosen as the mean value of the set $(X^j, Y^j)$:

$$X_0 = \frac{\sum_i^k X^j}{k}, \quad Y_0 = \frac{\sum_i^k Y^j}{k} \quad (6a)$$

or as the median value of the set $(X^j, Y^j)$:

$$X_0 = (\max(X^j, j=1, \ldots, k) + \min(X^j, j=1, \ldots, k))/2$$

$$Y_0 = (\max(Y^j, j=1, \ldots, k) + \min(Y^j, j=1, \ldots, k))/2 \quad (6b)$$

or as the place of the lens holder, or any other suitable point. Next, the following transformation takes place:

$$\Delta X^j = X^j - X_0$$

$$\Delta Y^j = Y^j - Y_0$$

$$R^j = \sqrt{\Delta X^{j2} + \Delta Y^{j2}}$$

$$\theta^j = \arctan(\Delta Y^j / \Delta X^j) \quad (7)$$

The value of θ is set according to the signs of ΔX, ΔY as follows:

| X-Y Plane Quarter | ΔX >= 0 | ΔX < 0 |
|---|---|---|
| ΔY <= 0 | 0° <= θ < 90° (1st quarter) | 90° <= θ < 180° (2nd quarter) |
| ΔY < 0 | 270° <= θ < 360° (4 quarter) | 180° <= θ < 270° (3 quarter) |

Figure 18A:
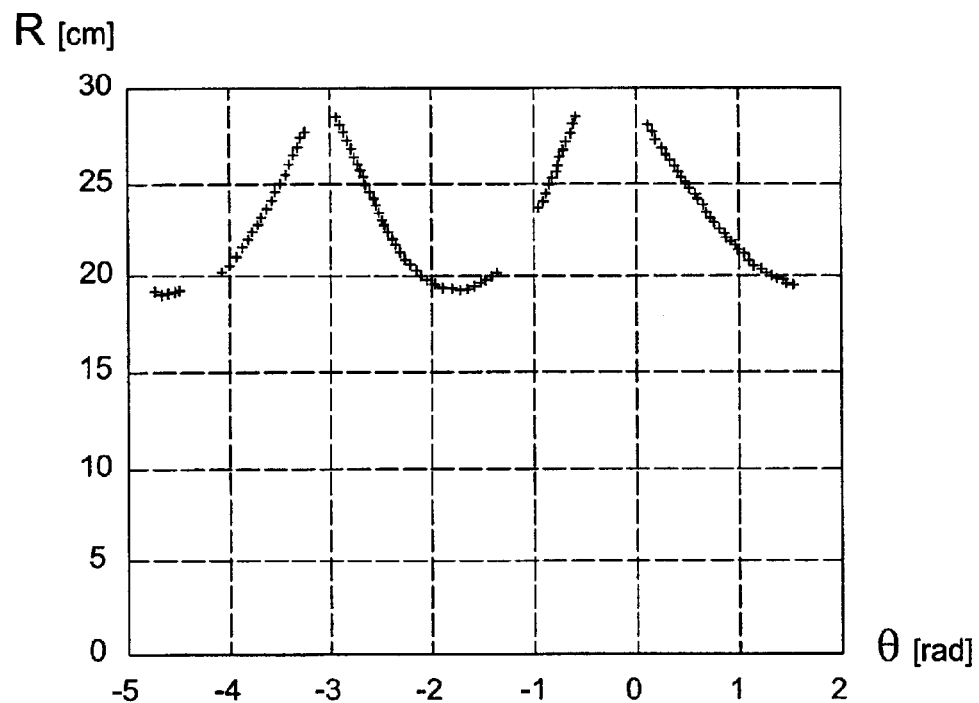
FIGS. 18A–B illustrate an exemplary algorithm for achieving outline completion, in accordance with an embodiment of the invention.
Figure 18B:
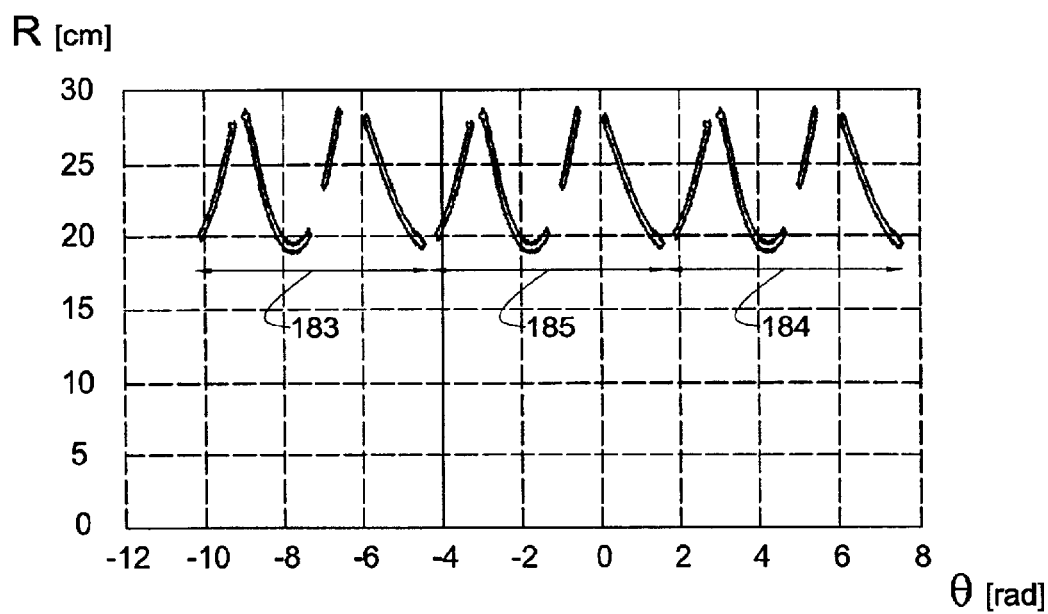

All $(R^m, \theta^m)$ points are then sorted in descending or ascending order of $\theta^j$ (abscissa θ) as shown in FIG. 18A. The sorted set of points is then filtered using the smoothing Spline method.

The Spline method receives a series of points as an input and provides as an output a fitted curve such that the sum of its Y values for the original $X^i$ points has the minimal mean value among all possible curves while keeping a smooth continuous function. In order to fulfil the appropriate edge condition (continuation and smoothness of edge points 181 and 182), two more sets of points are added to the R-θ plane: one is the original $(R^m, \theta^m)$ set of points shifted by −2π (183), and the other is the original set shifted by +2π (184), both being shifted relative to the original set (185), as shown in FIG. 18B. The Spline algorithm is implied on the multiple graph (i.e. the graph of FIG. 18B), hence taking care of the edge conditions.

The output graph in the range $(0 < \theta^i < \pi)$ is now chosen as the filtered data $R^i$ (i=1, . . . ,k).

At last, the required $(X^i, Y^i)$ points after filtration are received by reverse transformation:

$$X^i = R^i \cos(\theta^i)$$

$$Y^i = R^i \sin(\theta^i) \quad (8)$$

For example, applying the above algorithm would result in the completion of the outline in FIG. 17 and smoothing the curve as depicted in FIGS. 19A and 19B.

Note that whilst in the description above the outline is superimposed on the raw acquired image, this is not obligatory. By way of another embodiment, it can be displayed in a manner which enables comparison to any interim stage of the acquired image. An example of the latter is the superimposition of the outline on the image after undergoing the edge detection phase (i.e. in the form depicted in FIG. 10C).

As may be recalled, the so-calculated outline is also subjected to compensation (step 58 in FIG. 5) due to the lens curvature induced error, discussed above. There follows a description of an algorithm for accomplishing the specified compensation, with reference to FIGS. 20A–20F. The invention is by no means bound by this example.

Before turning to describing the algorithm on the merits, attention is drawn to FIG. 20A which serves for illustrating that the farther an object is from a focal point of an imaging device, the smaller is the image thereof. As is generally known, if two objects are given, one of which is farther away than the other (from the focal point of an imaging device), then the former appears to be smaller than the latter, by law of perspective. FIG. 20A illustrates an equivalent situation where two objects B 201 (larger and farther away) and A 202 (smaller and closer) which appear to be of the same size for a viewer at focal point 203.

When a (204 shown in side view in FIG. 20A) eyeglass lens is placed in a short focal length imaging device, the situation described with reference to FIG. 20A applies, since due to the lens curvature, the lens margins 205 are farther away from the focal point 203 than the outermost point of the lens 206. As a result, a distortion of the so-acquired lens image occurs.

This distortion affects the final product, the clip-on, aesthetically. A distortion of a few tenths of a millimeter will create a smaller clip-on; smaller enough to notice visually, as shown in FIG. 20B. By this particular example, the lens was scanned using an office scanner, which has only a single dimension of distortion, perpendicular to the scanning axis. The maximal total distortion between the original outline 2001 and the scanned outline 2002 is about 2.3 mm.

FIG. 20C shows in detail the distortion that is caused when an eyeglass (lens) is put on a small-focus imaging device. The main optical axis of the lens is parallel to Z-axis and the outermost point located at $Z_0$. Since the lens is curved, its edge point (i.e. the margin 205) is higher than $Z_0$, and it appears to be distorted as a closer point on the X-Y plane at $Z_0$(206).

Figure 20D:
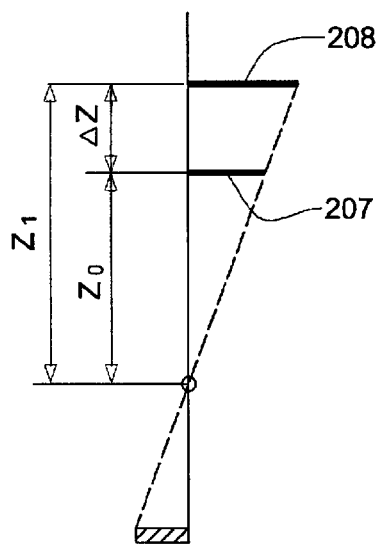

In general, the proportion between the lengths of two objects 207 and 208, $L_0$ and $L_1$, respectively, having the same effective length on an imaging system, is equal to the proportion between their distances from the imaging system $Z_0$ and $Z_1$, as is shown in FIG. 20D. "Effective length" refers to the length as seen on the imaging system. This is a simple geometrical relation leading to equation 1:

$$\frac{Z_1}{Z_0} = \frac{Z_0 + \Delta Z}{Z_0} = \frac{L_1}{L_0} \qquad (9a)$$

$$Z_0 = \frac{\Delta Z}{\left(\frac{L_1}{L_0} - 1\right)} \qquad (9b)$$

Figure 20E:
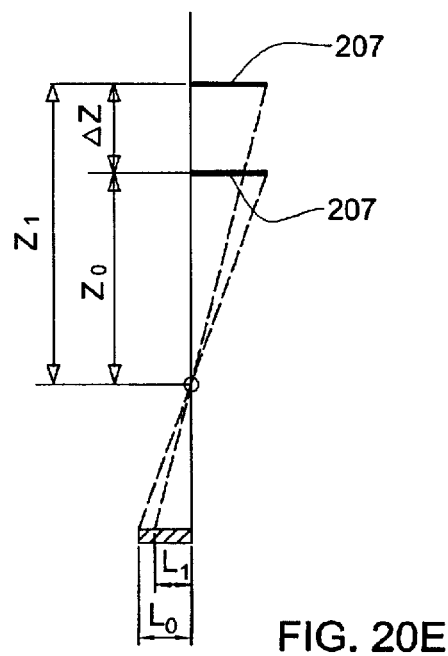

The same is valid for two objects of the same length (or even the same object) that are placed in two different distances $Z_0$ and $Z_1$, therefore having the effective lengths $L_0$ and $L_1$, as is shown in FIG. 20E.

There may be cases where $Z_0$ should be calculated using the known parameters of equation (9b) ($L_0'$, $L_1$ and $\Delta Z$). For example, $Z_0$ is calculated in the specific case of a curved lens where $Z_0$ is not provided, or, alternatively, where $Z_0$ is provided but the lens is positioned on the lens holder at a point higher than $Z_0$. On the basis of the information that the lens is part of a sphere, a correction algorithm is applied to compensate for the distortion.

The equation of a circle enables the calculation of the height of an arc based on the radius of circle R and the measured horizontal distance of the lens r. R can have only some discrete values received from another algorithm or from another measurement or known per se.

$$Z_1 = Z_0 + (R - \sqrt{R^2 - r_0^2}) \qquad (10)$$

$r_0$ is the effective length of the outline of the image as if it were located at $Z_0$; $r_1$ is the real length of the outline which is located at $Z_1$(FIG. 20F).

Figure 20F:
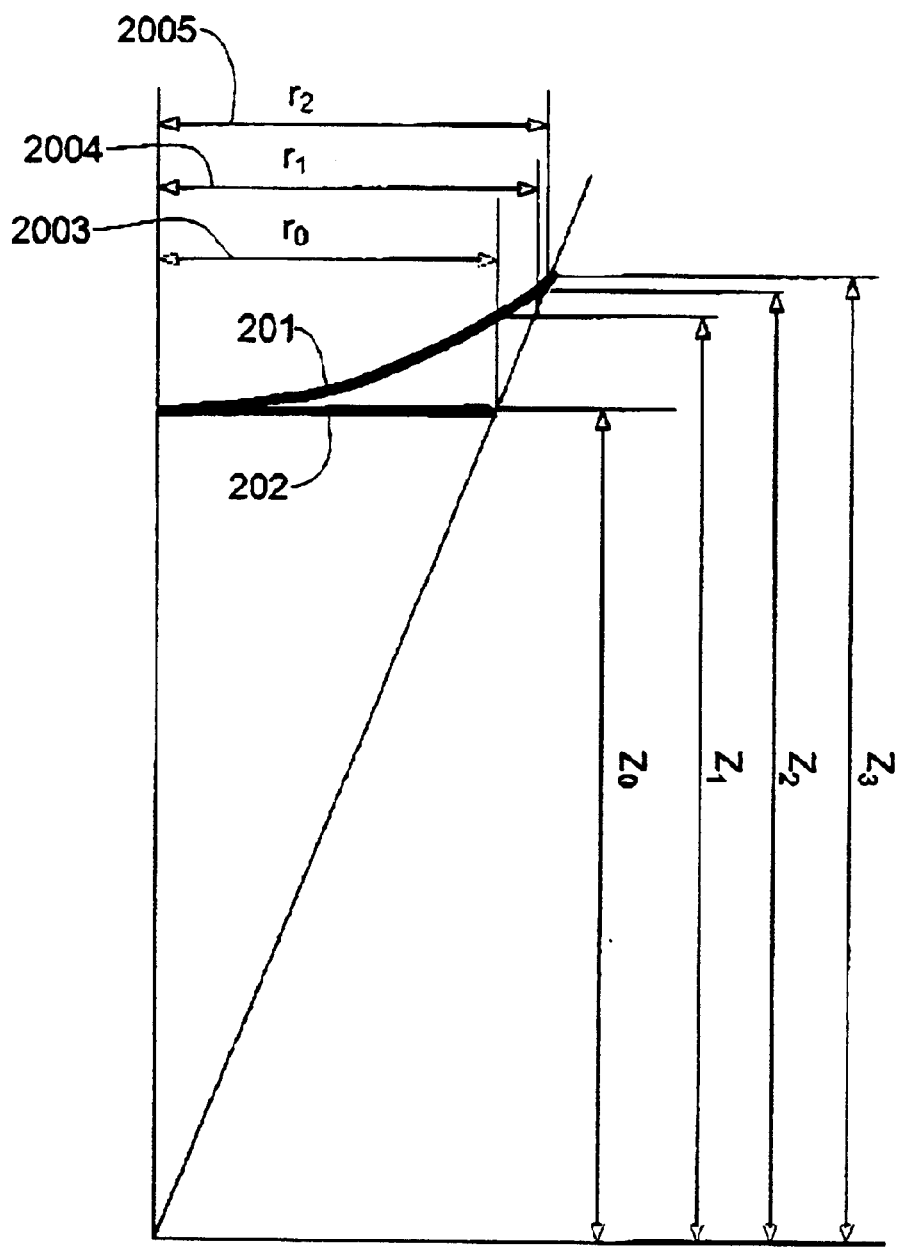

FIG. 20F illustrates the converging stages (three stages are shown $r_0$, $r_1$ and $r_2$ 2003, 2004 and 2005, respectively) of calculating $r_i$ in an iterative manner.

In an analogy to equation (9a):

$$r_1 = r_0 \frac{Z_1}{Z_0};$$

Hence $r_1$ is known as a function of $r_0$, $Z_0$ and $Z_1$. From equation (10) $Z_1$ is expressed in terms of $Z_0$, R and $r_0$. Therefore $r_1$ is also expressed in terms of $Z_0$, R and $r_0$. The next iteration uses $r_1$ to receive $Z_2$ as a function of the known $z_0$, R and $r_0$.

$$Z_2 = Z_0 + \left(R - \sqrt{R^2 - r_1^2}\right), r_2 = r_0 \frac{Z_2}{Z_0} \qquad (11)$$

which gives $r_2$ in terms of $Z_0$, R and $r_0$. For the $n^{th}$ iteration $$Z_n = Z_0 + \left(R - \sqrt{R^2 - r_{(n-1)}^2}\right), r_n = r_0 \frac{Z_n}{Z_0} \qquad (12)$$

Which gives $r_n$ as a function of $Z_0$, R and $r_0$ in a recursive function:

$$r_n = \frac{r_0}{Z_0}\left(Z_0 + \left(R - \sqrt{R^2 - r_{(n-1)}^2}\right)\right) = r_0\left(1 + \frac{\left(R - \sqrt{R^2 - r_{(n-1)}^2}\right)}{Z_0}\right) \qquad (13)$$

$r_n$ is a series of points that asymptotically diverges to the target point. The difference between successive points $\Delta r_n = r_n - r_{n-1}$ becomes smaller and smaller (otherwise this point was not acquired on the imaging device). The stopping criterion for the iterative process is given by:

$$\Delta r_n = r_n - r_{n-1} < \text{Err} \qquad (14)$$

where Err is the allowed error whose magnitude determines the number of iterations to be done.

The correction algorithm of equation (13) and the error criterion of equation (14) are applied to reconstruct the whole outline out of the scanned one. The characteristics of the imaging device determine if the distortion is both in X and Y axis (e.g. in a digital camera, CCD) or in one axis only (e.g. in an office scanner).

The calculations made above are applied to a series of m points on the scanned outline:

$$(X^j, Y^j, j=1, \ldots, m) \qquad (15)$$

The reference point for calculations $[X_{ref}, Y_{ref}, Z_{ref}=Z_0]$ is, for example, the point of the lens holder.

For each point in the first case (distortion along both X and Y axis), the distorted $l^{th}$ point on the outline is written as:

$$r_1^j = \sqrt{(X^j - Xref)^2 + (Y^j - Yref)^2}, \qquad (16)$$

$$j = 1, \ldots m; l = 1, \ldots, n$$

where 1 is the iteration index and j—the number of point on outline. The $n^{th}$ iteration gives in analogy to equation (13):

$$r_n^j = r_0^j\left(1 + \frac{\left(R - \sqrt{R^2 - r_{(n-1)}^{j\,2}}\right)}{Z_0}\right), j = 1, \ldots, m \qquad (17)$$

The transformation to the original axis X and Y are done by using a linear assumption, i.e. that the correction is radial: the relative change in each component X and Y is the same as the relative change in r:

$$\frac{X_{corrected}^j - X_{ref}}{X_0^j - X_{ref}} = \frac{r_0^j}{r_n^j} \qquad (18)$$

$$\frac{Y_{corrected}^j - Y_{ref}}{Y_0^j - Y_{ref}} = \frac{r_0^j}{r_n^j}$$

The algorithm for this kind of distortion is summarized as:

$$r_0^j = \sqrt{(X^j - X_{ref})^2 + (Y^j - Y_{ref})^2}, j = 1, \ldots, m \qquad (19)$$

$$r_1^j = r_0^j \left(1 + \frac{\left(R - \sqrt{R^2 - (r_{(n-1)}^j)^2}\right)}{Z_0}\right), \; l^{th} \text{ iteration for } j^{th} \text{ point}$$

stopping criterion:

$$\Delta r_n^j = r_n^j - r_{n-1}^j < Err$$

The corrected values:

$$X_{corrected}^j = X_{ref} + (X_0^j - X_{ref})\frac{r_n^j}{r_0^j}$$

$$Y_{corrected}^j = Y_{ref} + (Y_0^j - Y_{ref})\frac{r_n^j}{r_0^j}$$

In the second case where the distortion is only in a single axis, e.g., X axis, the equation (19) is replaced by:

$$r_0^j = (X^j - X_{ref}), \; j = 1, \ldots, m \quad (20)$$

$$r_1^j = r_0^j \left(1 + \frac{\left(R - \sqrt{R^2 - (r_{(n-1)}^j)^2}\right)}{Z_0}\right), \; l^{th} \text{ iteration for } j^{th} \text{ point}$$

stopping criterion:

$$\Delta r_n^j = r_n^j - r_{n-1}^j < Err$$

The corrected values:

$$X_{corrected}^j = X_{ref} + r_n^j$$

$$Y_{corrected}^j = Y^j, \; \text{unchanged}$$

It should be noted that experiments carried out with lenses of different curvatures, demonstrated that the error gets smaller at every iteration by a factor that is greater than 2. Thus, the total accumulated error from step n+1 and onwards is smaller than the error in the $n^{th}$ iteration, and thus can be neglected in both cases once the stopping criterion is fulfilled. Note the invention is by no means bound by the compensation procedure described above with reference to FIGS. 20A–F.

After having calculated an outline in the manner specified, (step 59 in FIG. 5), there follow a series of steps for determining inter alia supplemental locations for clip-on parts (steps 503 and 505). To this end, database (501) is used. Those versed in the art will readily appreciate that the invention is not bound by this particular database, its contents and arrangement.

Clip-on database (501) holds data that pertain to locations of clip-on parts (e.g. holes/grooves that accommodate clip-on bridge and legs), depending upon the clip-on type. Upon selection of a clip-on from a library of possible clip-ons (whose data are stored in database (501)), the pertinent data associated with the selected clip-on can be extracted from the database (501). Typical, yet not exclusive, data that can be extracted from the database are the dimensions of the required holes/slots that are associated with this particular clip-on; other data being the number of parts (e.g. number of legs) that should be used. The latter data may sometimes be determined only upon calculation of the outline data. If the user is prompted to select not only the clip-on type, but also the form of clip-on parts (e.g. design of legs, bridges), the dimensions of the pertinent holes/slots are extracted only upon selecting the desired parts.

Note that the database cannot hold the precise location on the clip-on of the holes/slots for the clip-on parts (e.g. legs and bridge), since these data are dependent upon the shape of the frame, and, accordingly, the location can be calculated only after determining the outline of the frame.

Figure 21A:
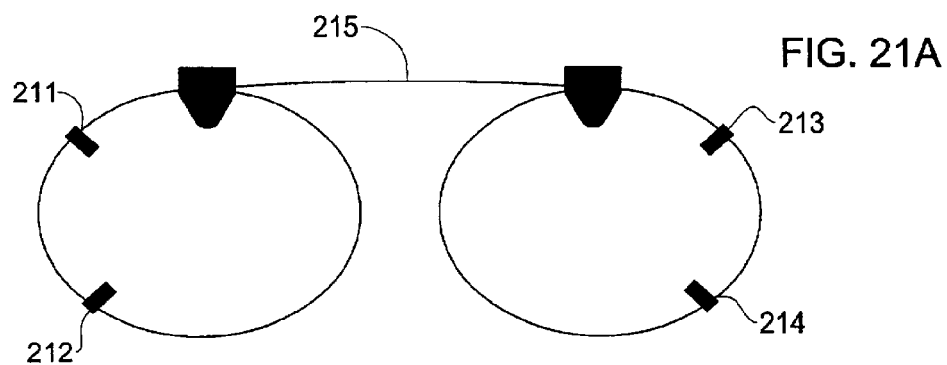
FIGS. 21A–B illustrate an exemplary clip-on with clip-on parts anchored thereto, and an eyepiece of the clip-on with slots and a hole for receiving the clip-on parts, in accordance with an embodiment of the invention.
Figure 21B:
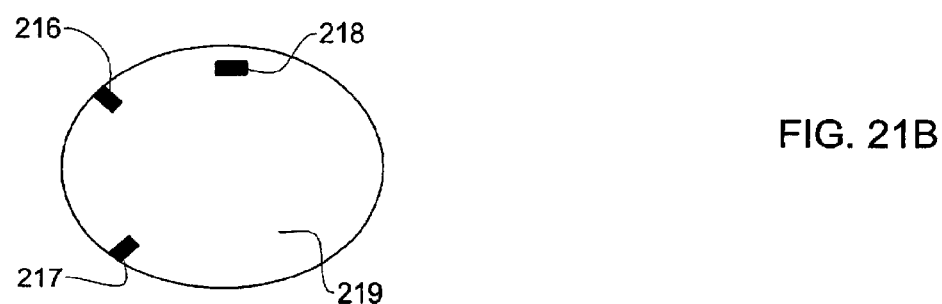

FIGS. 21A illustrate a pair of clip-ons with four legs (211 to 214) and a bridge (215). FIG. 21B illustrates an eyepiece (219) with slots (216) and (217), and a hole (218) that correspond to legs (211) and (212) and bridge end (218).

Figure 22:
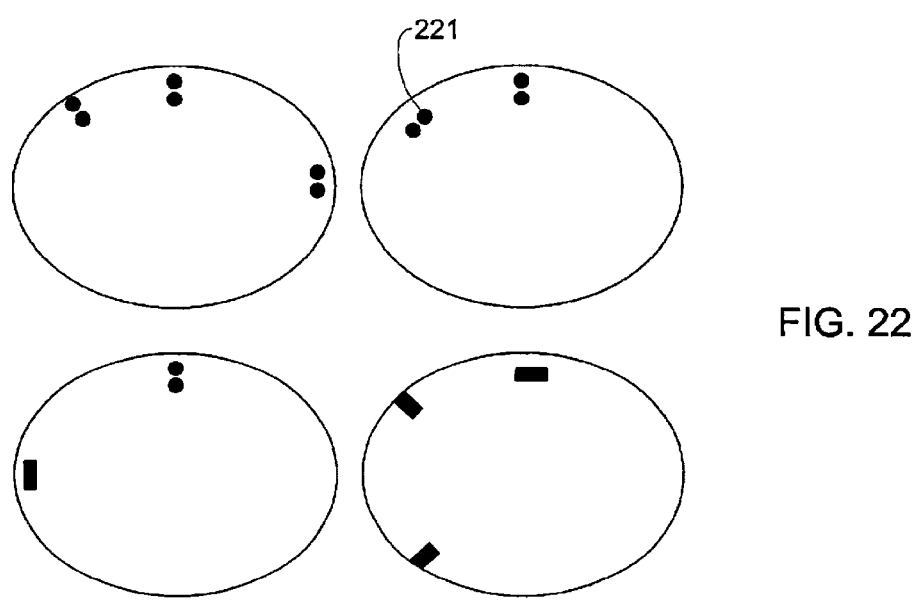
FIG. 22 illustrates few other embodiments of an eyepiece of the clip-on, with slots and a hole for receiving the clip-on parts.

The design of FIG. 21 is, of course, not binding. FIG. 22 illustrates another four non-limiting examples with different locations of legs/bridge and different slot/hole configurations. For example, there are two holes (221) that are adapted to anchor each leg (not shown).

Figure 23:
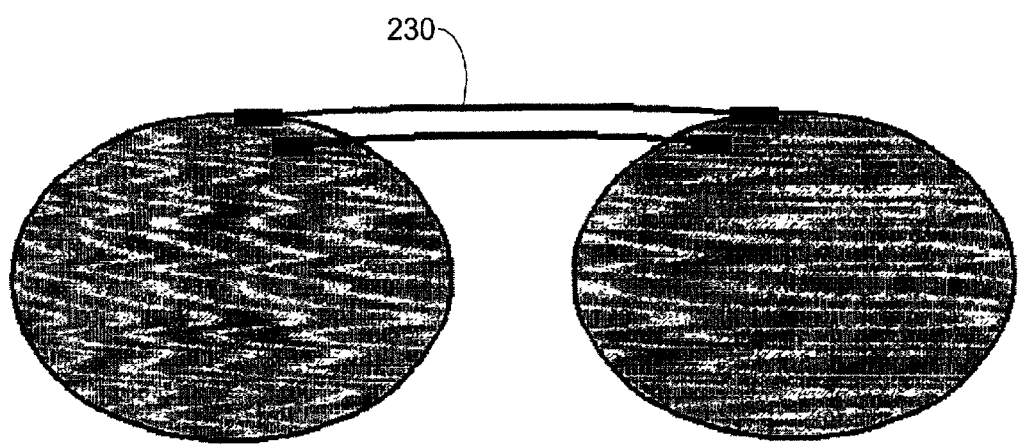
FIG. 23 illustrates an exemplary clip-on with a bridge selected from a library of available bridges, in accordance with an embodiment of the invention.

The selection (step 502 in FIG. 5) of the clip-on and possible clip-on parts from the database (501) is accomplished using a user interface presenting to the user the various available options. An exemplary presentation is shown in FIG. 23, where the user selects a given design of a bridge (230) (from a repertoire of bridges that are available—not shown) and, in response, a simulated clip-on with the selected bridge is shown, enabling the user to get the impression how the clip-on would eventually look and modify his selection, if necessary (e.g. picking up a different bridge design).

Figure 24A:
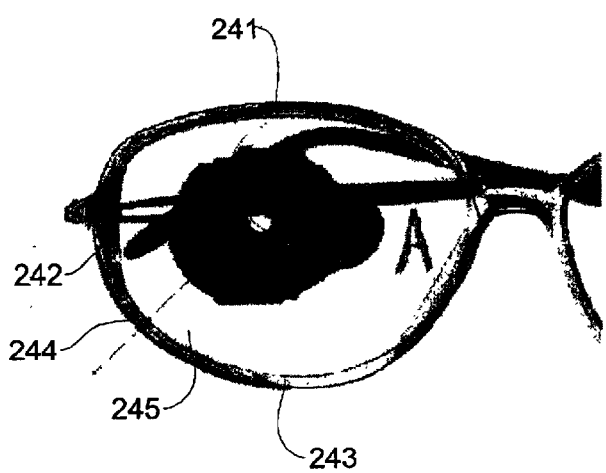
FIGS. 24A–B illustrate two images of an eyepiece which will assist in explaining the step of positioning the clip-on parts, in accordance with an embodiment of the invention.
Figure 24B:
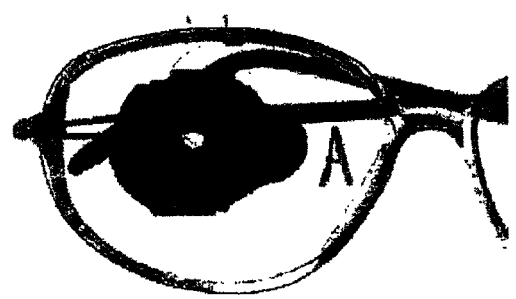

Having selected the clip-on parts, their location is determined (step (503) in FIG. 5). For a better understanding of the foregoing, attention is now directed to FIG. 24A and 24B. By this embodiment, at this stage, the outline is already calculated (e.g. 241), and the number of slots/holes as well as their sizes are also determined from the previous stages, considering that the consumer has already selected the legs/bridge, or these parts were selected automatically, whichever the case may be. The appropriate module can "propose" the precise location of the so-selected parts. For example, the location module can propose a sector having sector ends (242 and 243), which is characterized by the provision of a maximal grip enabling appropriate mounting of the clip-on onto its matching eyeglasses. Note that the consumer can set a desired location that falls in the proposed arc (say 244), and this will prescribe the precise location of the hole (say 245). In the case of a bridge, the options are, as a rule, more limited but, nonetheless, if there is more than one option, it will be displayed to the consumer (FIG. 24B).

The outline data and the holes/slots data (constituting by this non-limiting example the supplemental data) are translated to machine code (506), depending upon the format and configuration that are appropriate for the specific shaping machine under consideration. To this end, forming machine database (507) is accessed, extracting, for example, the following parameters: the size of the cutting tool, the direction and velocity of cutting, and possibly others, all as required and appropriate. An example of the shaping machine is described in the co-pending application entitled "Computer-Controlled Milling Machine For Producing Lenses For Clip-On Accessory", filed on Nov. 26, 2001.

Note that whilst the description focused mainly in the operational steps as depicted in FIG. 5, the invention is by no means bound by this exemplary sequence of steps.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, alphabetic characters and Roman numerals used to designate claim steps are provided for convenience only and do not imply any particular order of performing the steps.

The invention has been described with a certain degree of particularity but those versed in the art will readily appreciate that various alterations and modifications my be carried out without departing from the following Claims:

What is claimed is:

1. A method for imaging eyeglasses, and obtaining data indicative of at least an outline of the eyeglasses and designated locations associated with the outline, comprising:
   (a) placing the eyeglasses for imaging;
   (b) acquiring and displaying an image of the eyeglasses using a short focal length imaging device;
   (c) calculating and displaying an editable outline for each eyepiece of the eyeglasses, such that the editable outline can be compared to a respective eyepiece of the image;
   (d) calculating supplemental locations associated with the outline for anchoring parts of an add-on unit; and
   (e) providing data indicative of at least said outline and said supplemental locations;
   whereby said data is useable for shaping lenses of at least one customized add-on unit and manufacturing in a non-industrial scale the at least one add-on unit having, each, a size and shape that substantially matches the eyeglasses.

2. A method for imaging eyeglasses having lenses, and obtaining data indicative of at least an outline of the eyeglasses and designated locations associated with the outline, comprising:
   (i) placing the eyeglasses for imaging;
   (ii) acquiring and displaying an image of the eyeglasses using a short focal length imaging device;
   (iii) calculating and displaying an editable outline for each eyepiece of the eyeglasses, such that the editable outline can be compared to a respective eyepiece of the image;
   (iv) calculating supplemental locations associated with the outline for manufacturing holes and/or slots that anchor clip-on parts that include bridge and legs; and
   (v) providing data indicative of at least said outline and said supplemental locations;
   whereby said data is useable for shaping clip-on lenses and shaping holes or slots in the clip-on lenses in order to anchor the clip-on parts to the clip-on lenses and to manufacture in a non-industrial scale at least one customized clip-on having, each, a size and shape that substantially matches the eyeglasses.

3. The method according to claim 2, wherein said step (b) includes:
   providing an imaging window for a scanned eyepiece; the window embraces an eyepiece of said eyeglass and at least half of said eyeglass bridge, so as to obtain an image of the scanned eyepiece that includes an eyepiece image;
   said step (c) includes: calculating and displaying said editable outline in respect of the scanned eyepiece;
   said step (d) includes: calculating said supplemental locations in respect of the scanned eyepiece;
   said method further comprising calculating an editable outline and supplemental locations for the other non scanned eyepiece.

4. The method according to claim 2, wherein said editable outline is substantially superimposed on the image or derivative thereof and displayed in a distinguishable manner.

5. The method according to claim 3, wherein said editable outline is substantially superimposed on the image or derivative thereof and displayed in a distinguishable manner.

6. The method according to claim 2, further comprising the step of: providing an interface for editing the image; said editing includes at least removal of the bridge or substantial part thereof.

7. The method according to claim 4, further comprising the step of: providing an interface for editing the image; said editing includes at least removal of the bridge or substantial part thereof.

8. The method according to claim 6, wherein said step (c) includes calculating substantial part of said outline for the eyepiece, and calculating a supplemental part of the outline which includes sector that substantially corresponds to the bridge area during said editing step.

9. The method according to claim 7, wherein said step (c) includes calculating substantial part of said outline for the frame eyepiece, and calculating a supplemental part of the outline which includes sector that substantially corresponds to the bridge area after said editing step.

10. The method according to claim 2, wherein said step (c) includes: providing lens curvature data and applying compensation to said outline according to said lens curvature.

11. The method according to claim 4, wherein said step (c) includes: providing lens curvature data and applying compensation to said outline according to said lens curvature.

12. The method according to claim 8, wherein said step (c) includes: providing lens curvature data and applying compensation to said outline according to said lens curvature.

13. The method according to claim 9, wherein said step (c) includes: providing lens curvature data and applying compensation to said outline according to said lens curvature.

14. The method according to claim 10, wherein said providing step includes: receiving or extracting said lens curvature data.

15. The method according to claim 11, wherein said providing step includes: receiving or extracting said lens curvature data.

16. The method according to claim 12, wherein said providing step includes: receiving or extracting said lens curvature data.

17. The method according to claim 13, wherein said providing step includes: receiving or extracting said lens curvature data.

18. The method according to claim 10, wherein said providing step includes: calculating automatically said lens curvature data.

19. The method according to claim 11, wherein said providing step includes calculating automatically said lens curvature data.

20. The method according to claim 12, wherein said providing step includes calculating automatically said lens curvature data.

21. The method according to claim 13, wherein said providing step includes calculating automatically said lens curvature data.

22. The method according to claim 1, wherein said imaging device includes an illumination source in the visible range.

23. The method according to claim 2, wherein said imaging device includes an illumination source in the visible range.

24. The method according to claim 1, wherein said imaging device includes an illumination source in the ultraviolet range.

25. The method according to claim 2, wherein said imaging device includes an illumination source in the ultraviolet range.

26. The method according to claim 1, wherein said eyeglasses include lenses fitted in a frame.

27. The method according to claim 2, wherein said eyeglasses include lenses fitted in a frame.

28. The method according to claim 1, wherein said eyeglasses are rimless.

29. The method according to claim 2, wherein said eyeglasses are rimless.

30. The method of claim 1, further comprising the steps of: providing an interface for selecting add-on parts from a repertoire of available add-on parts; and in response to user selection, displaying the add-on image with the selected parts, and upon approval of the user calculating the supplemental locations that correspond to the selected parts.

31. The method of claim 2, further comprising the steps of: providing an interface for selecting clip-on parts from a repertoire of available clip-on parts; and in response to user selection, displaying the clip-on image with the selected parts, and upon approval of the user calculating the supplemental locations that correspond to the selected parts.

32. A method for manufacturing in a non-industrial scale and substantially in real-time at least one customized clip-on having, each, size and shape that substantially matches an eyeglasses frame, the method comprising the steps of:
  (i) placing the eyeglasses for imaging;
  (ii) acquiring and displaying an image of the eyeglasses using a short focal length imaging device;
  (iii) calculating and displaying an editable outline for each eyepiece of the eyeglasses, such that the editable outline can be compared to a respective eyepiece of the image;
  (iv) calculating supplemental locations associated with the outline for manufacturing holes and/or slots that anchor clip-on parts that include at least bridge and legs; and
  (v) providing to a shaping machine data indicative of at least said outline and said supplemental locations;
  (vi) shaping clip-on lenses and shaping holes and/or slots in the clip-on lenses according to said provided data; and
  (vii) assembling the clip-on lenses and the clip-on parts so as to produce said at least one clip-on.

33. A method for imaging eyeglasses having lenses, and obtaining data indicative of at least an outline of the eyeglasses and designated locations associated with the outline, comprising:
  (i) placing the eyeglasses on an electronic device for imaging;
  (ii) acquiring and displaying an electronic image of the eyeglasses;
  (iii) calculating and displaying an editable outline for each eyepiece of the eyeglasses, such that the editable outline can be compared to a respective eyepiece of the image;
  (iv) calculating supplemental locations associated with the outline for anchoring clip-on parts; and
  (v) providing data indicative of at least said outline and said supplemental locations;
    whereby said data is useable for shaping clip-on lenses and to manufacture in a non-industrial scale at least one customized clip-on having, each, a size and shape that substantially matches the eyeglasses.

34. The method according to claim 33, wherein said step (ii) includes: acquiring and displaying an image of the eyeglasses using a short focal length imaging device.

35. The method according to claim 33, wherein said step (ii) includes: acquiring and displaying an image of the eyeglasses using a long focal length imaging device.

36. A system for imaging eyeglasses, and obtaining data indicative of at least an outline of the eyeglasses and designated locations associated with the outline, comprising;
  a positioning device for placing the eyeglasses for imaging;
  a short focal length imaging device configured to acquire an image of the eyeglasses;
  a processor and associated display configured to perform at least the following:
  calculating an editable outline for each eyepiece of the eyeglasses and display said outline and said image, such that the editable outline can be compared to a respective eyepiece of the image;
    calculating supplemental locations associated with the outline for anchoring parts of an add-on unit; and
    providing data indicative of at least said outline and said supplemental locations,
    whereby said data is useable for shaping lenses of at least one customized add-on unit and manufacturing in a non-industrial scale the at least one add-on unit having, each, a size and shape that substantially matches the eyeglasses.

37. A system for imaging eyeglasses having lenses, and obtaining data indicative of at least an outline of the eyeglasses and designated locations associated with the outline, comprising:
  a positioning device for placing the eyeglasses for imaging;
  a short focal length imaging device for acquiring an image of the eyeglasses;
  a processor and associated display configured to perform at least the following:
  calculating an editable outline for each eyepiece of the eyeglasses and display said outline and said image, such that the editable outline can be compared to a respective eyepiece of the image;
  calculating supplemental locations associated with the outline for manufacturing holes and/or slots that anchor clip-on parts that include bridge and legs; and
  providing data indicative of at least said outline and said supplemental locations;
    whereby said data is useable for shaping clip-on lenses and shaping holes or slots in the clip-on lenses in order to anchor the clip-on parts to the clip-on lenses and to manufacture in a non-industrial scale at least one customized clip-on having, each, a size and shape that substantially matches the eyeglasses.

38. A system for manufacturing in a non-industrial scale and substantially in real-time at least one customized clip-on having, each, size and shape that substantially matches an eyeglasses frame, the system comprising:

a positioning device for placing the eyeglasses for imaging;

a short focal length imaging device for acquiring an image of the eyeglasses;

a processor and associated display configured to perform at least the following:

calculating an editable outline for each eyepiece of the eyeglasses and displaying the outline and the image, such that the editable outline can be compared to a respective eyepiece of the image;

calculating supplemental locations associated with the outline for manufacturing holes and/or slots that anchor clip-on parts that include at least bridge and legs;

providing to a shaping machine data indicative of at least said outline and said supplemental locations;

the shaping machine responsive to said data for shaping clip-on lenses and shaping holes and/or slots in the clip-on lenses according to said provided data, for assembling the clip-on lenses and the clip-on parts so as to produce said at least one clip-on.

39. A system for imaging eyeglasses having lenses, and obtaining data indicative of at least an outline of the eyeglasses and designated locations associated with the outline, comprising:

a positioning device for placing the eyeglasses for imaging;

an imaging device for acquiring and displaying an image of the eyeglasses;

a processor and associated display configured to perform at least the following:

calculating an editable outline for each eyepiece of the eyeglasses and displaying the outline and the image, such that the editable outline can be compared to a respective eyepiece of the image;

calculating supplemental locations associated with the outline for anchoring clip-on parts; and providing data indicative of at least said outline and said supplemental locations;

whereby said data is useable for shaping clip-on lenses and to manufacture in a non-industrial scale at least one customized clip-on having, each, a size and shape that substantially matches the eyeglasses.

40. A method for imaging eyeglasses having lenses, and obtaining data indicative of at least an outline of the eyeglasses and designated locations associated with the outline, comprising:

(i) placing the eyeglasses for imaging;

(ii) acquiring and displaying an image of the eyeglasses using a short focal length imaging device;

(iii) calculating and displaying an editable outline for each eyepiece o the eyeglasses, such that the editable outline can be compared to a respective eyepiece of the image;

(iv) calculating supplemental locations associated with the outline for anchoring clip-on parts; and (v) providing data indicative of at least said outline and said supplemental locations;

whereby said data is useable for shaping clip-on lenses and to manufacture in a non-industrial scale at least one customized clip-on having, each, a size and shape that substantially matches the eyeglasses.

41. A method for imaging eyeglasses having lenses, and obtaining data indicative of at least an outline of the eyeglasses and designated locations associated with the outline, comprising:

(i) placing the eyeglasses for imaging;

(ii) acquiring and displaying an image of the eyeglasses using a short focal length imaging device;

(iii) calculating and displaying an editable outline for each eyepiece o the eyeglasses, such that the editable outline can be compared to a respective eyepiece of the image;

(iv) calculating supplemental locations associated with the outline for anchoring clip-on parts; and (v) providing data indicative of at least said outline and said supplemental locations;

whereby said data is useable for shaping clip-on lenses and to manufacture in a non-industrial scale at least one customized clip-on having, each, a size and shape that substantially matches the eyeglasses.

\* \* \* \* \*